United States Patent

Yumiki

(10) Patent No.: US 8,345,141 B2
(45) Date of Patent: Jan. 1, 2013

(54) CAMERA SYSTEM, CAMERA BODY, INTERCHANGEABLE LENS UNIT, AND IMAGING METHOD

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 1050 days.

(21) Appl. No.: 12/064,775

(22) PCT Filed: Dec. 5, 2006

(86) PCT No.: PCT/JP2006/324200
§ 371 (c)(1),
(2), (4) Date: Feb. 25, 2008

(87) PCT Pub. No.: WO2007/066629
PCT Pub. Date: Jun. 14, 2007

(65) Prior Publication Data
US 2009/0268075 A1    Oct. 29, 2009

(30) Foreign Application Priority Data
Dec. 7, 2005    (JP) ................................. 2005-352965

(51) Int. Cl.
*H04N 5/222* (2006.01)

(52) U.S. Cl. ......... 348/333.05; 348/333.01; 348/333.02; 348/333.03; 348/333.04; 348/333.06; 348/333.07; 348/333.08; 348/333.09; 348/333.11; 348/333.12

(58) Field of Classification Search .......................... None
See application file for complete search history.

(56) References Cited

U.S. PATENT DOCUMENTS

| 5,557,358 | A | * | 9/1996 | Mukai et al. | 396/296 |
| 7,133,608 | B1 | * | 11/2006 | Nagata et al. | 396/374 |
| 7,162,101 | B2 |  | 1/2007 | Itokawa et al. | |

FOREIGN PATENT DOCUMENTS

| JP | 2000-125153 |   | 4/2000 |
| JP | 2000-165707 | A | 6/2000 |
| JP | 2001-117163 | A | 4/2001 |
| JP | 2001-125173 |   | 5/2001 |
| JP | 2001-318415 |   | 11/2001 |
| JP | 2002-330334 | A | 11/2002 |
| JP | 2003-60943  |   | 2/2003 |
| JP | 2003-199099 | A | 7/2003 |
| JP | 2005-10643  |   | 1/2005 |
| JP | 2005-229326 |   | 8/2005 |

* cited by examiner

*Primary Examiner* — Jefferey Harold
*Assistant Examiner* — Omer Khalid
(74) *Attorney, Agent, or Firm* — McDermott Will & Emery LLP

(57) ABSTRACT

An imaging device that is able to display an image with an aperture value at the time when actually photographing on a liquid crystal display monitor for displaying an image, in a single-lens reflex digital camera is provided. In a depth-of-field preview mode, a quick return mirror (4) is retracted from an optical path and light is incident on an imaging sensor (11). Then, an imaging optical system is controlled to be in an actual aperture state, and by displaying an image data obtained at the imaging sensor (11) on the liquid crystal display monitor (16) for displaying an image, a plurality of images with aperture values at the time of actually photographing, in other words, actual aperture live view images, can be concurrently displayed simultaneously on the liquid crystal display monitor (16) for displaying an image. By doing so, it is possible to easily compare images with different depths of field, and it is possible to simultaneously photograph images with different depths of field.

11 Claims, 15 Drawing Sheets

CAMERA SYSTEM, CAMERA BODY, INTERCHANGEABLE LENS UNIT, AND IMAGING METHOD

RELATED APPLICATIONS

This application is the U.S. National Phase under 35 U.S.C. §371 of International Application No. PCT/JP2006/324200, filed on Dec. 5, 2006, which in turn claims the benefit of Japanese Application No. JP 2005-352965, filed on Dec. 7, 2005, the disclosures of which Applications are incorporated by reference herein.

TECHNICAL FIELD

The present invention relates to a camera system, a camera body, an interchangeable lens unit, and an imaging method. In particular, the present invention relates to a single-lens reflex digital camera and the like that includes an aperture value alteration function.

BACKGROUND ART

A single-lens reflex digital camera that is able to convert the optical image of a subject into an electrical image signal and output the signal has been rapidly growing in popularity in recent years. With this single-lens reflex digital camera, the light (or the image of the subject) incident on a camera lens is reflected by a reflecting mirror that is arranged on the photographing optical path behind the lens, and therefore changing the optical path, and is erected into an erect image by passing through a pentaprism and the like, and guided to the optical viewfinder. As a result, a user is able to see the image of the subject that passed through the lenses from the optical viewfinder, when a user and the like observes a subject using a viewfinder. Therefore, the position that the viewfinder optical path is formed is normally the fixed position of the reflecting mirror.

Meanwhile, in the case that the lenses are used for photographing, the reflecting mirror quickly changes the position thereof to retract from the photographing optical path, and by doing so, the viewfinder optical path can be switched to the photographing optical path. Then, the reflecting mirror quickly returns to the fixed position after photographing ends. This system is the same for a conventional silver halide camera or a digital camera, if it is a single-lens reflex system.

One characteristic of a digital camera is that a user takes a picture while looking at a display device (for example, a liquid crystal display monitor used for displaying an image) when photographing, and the image that is photographed can be confirmed immediately after it is taken. However, a problem occurs that a user will not be able to use a liquid crystal display monitor that is used for displaying an image when photographing, if the conventional method of the single-lens reflex reflecting mirror is used in a digital camera. In this way, it becomes extremely difficult especially for a beginner who is inexperienced with photographing using a digital camera to use the camera, because a user is not able to use the liquid crystal display monitor that is used for displaying an image to photograph and can't help photographing by peeping at the viewfinder. Therefore, users demand for a function in the digital camera so that a picture can be taken using a liquid crystal display monitor used for displaying an image even during the time of photographing, and a single-lens reflex digital camera that includes a function in which a picture can be taken using a display device such as a liquid crystal display monitor and the like that is used for displaying an image even during the time of photographing has been proposed (for example, Patent Citation 1).

Patent Citation 1: Patent 2001-125173

DISCLOSURE OF INVENTION

Technical Problem

Normally, compared to a normal compact digital camera, since a large size image pickup device is used in a single-lens reflex digital camera, on the subject image that is formed on the image pickup device, the focused region is small, and the depth of field is shallow. Therefore, when using a single-lens reflex digital camera to take a picture, it is important to adjust the aperture and check the depth of field.

However, in a conventional digital camera of the single-lens reflex system, since the depth of field was checked by the user peeping at the viewfinder of the digital camera, a user was not able to use the liquid crystal display monitor that is used to display an image to check the depth of field, even in a digital camera of a single-lens reflex system that is equipped with a liquid crystal display monitor that is used for displaying an image. In other words, a system in which a user is able to check the so-called actual aperture live view image, which is an image with the aperture value at the time when actually photographing, using a liquid crystal display monitor that is used for displaying an image is desired.

The object that the present invention intends to achieve is to allow a user to be able to photograph while looking at a liquid crystal display monitor that is used for displaying an image, and to achieve a camera system and an imaging method in which images with different depths of field can be compared easily by concurrently displaying a plurality of actual aperture live view images with aperture values at the time of actually photographing simultaneously on the liquid crystal display monitor for displaying an image, and to achieve a camera body and an interchangeable lens unit that are used in this camera system.

Technical Solution

A first aspect of the present invention is a camera system that includes an imaging optical system, an imaging unit, an image display unit, and an aperture setting unit. The imaging optical system has an aperture, and focuses the light from a subject. The imaging unit converts the light from the imaging optical system into an electrical signal to obtain an image taken. The image display unit includes a display region including a first display region and a second display region, and displays an image taken that is obtained at the imaging unit on the display region. The aperture setting unit adjusts the aperture and sets the aperture value of the imaging optical system. Then, the image display unit displays a first image taken that is obtained by the imaging unit on the first display region in the case that the aperture value is set to be a first aperture value by the aperture setting unit, and displays a second image taken that is obtained by the imaging unit on the second display region in the case that the aperture value is set in a second aperture value by the aperture setting unit, and by doing so, displays both the first image taken and the second image taken on the display region.

In this camera system, the light from a subject is focused by the imaging optical system that includes an aperture, and is converted into an image that is taken, by the imaging unit. The converted image taken is displayed on a display region that includes a first display region and a second display region by an image display unit. In addition, in this camera system, it is possible to set the aperture value of the imaging optical system by an aperture setting unit. In the case that the aperture value is set in a first aperture value by the aperture setting unit, the first image taken that is obtained by the imaging unit is displayed on the first display region by the image display unit. In the case that the aperture value is set in a second aperture value by the aperture setting unit, the second image taken that is obtained by the imaging unit is displayed on the second display region by the image display unit. By doing so, it is possible to display both the first image taken and the second image taken on the display region of the image display unit.

As a result, it is possible for a user to take a picture while looking at the images taken that are displayed on the display region of the image display unit, and it is possible to easily compare the images taken with different depths of field, by concurrently displaying a plurality of actual aperture live view images with aperture values at the time when actually photographing simultaneously on the display region of the image display unit.

A second aspect of the present invention is that of the first aspect of the present invention, and that an image recording unit that records the first image taken and the second image taken is further comprised.

As a result, since it is possible to record and keep the first image taken and the second image taken in the image recording unit, it is possible to display one of either, or both, the first image taken and the second image taken on the display region of the image display unit at any timing.

A third aspect of the present invention is that of the second aspect of the present invention, and that the image recording unit records the aperture value at the time the first image taken is obtained to correspond to the first image taken, and records the aperture value at the time the second image taken is obtained to correspond to the second image taken.

As a result, it is possible to easily find out the aperture value at the time when a photographed image is taken that is recorded in the image recording unit.

A fourth aspect of the present invention is that of one of any of the first to the third aspects of the present invention, and that an observing optical system, a movable mirror, a photographing mode switching unit, and a depth-of-field preview mode setting unit are further comprised. The observing optical system is for observing the light from the imaging optical system. The movable mirror is arranged between the imaging optical system and the imaging unit, and is able to be in a first position for leading the light from the imaging optical system to the observing optical system, and a second position for leading the light from the imaging optical system to the imaging unit. The photographing mode switching unit switches between a first photographing mode in which an image is taken with the position of the movable mirror being arranged in the first position, and a second photographing mode in which an image is taken with the position of the movable mirror being arranged in the second position. The depth-of-field preview mode setting unit is a unit in which information for setting the mode to a depth-of-field preview mode is inputted. And, in the case that the information is inputted for setting the mode to the depth-of-field preview mode in the depth-of-field preview mode setting unit, and that the mode is set in the depth-of-field preview mode by the depth-of-field preview mode setting unit, the aperture setting unit adjusts the aperture so that the aperture value of the imaging optical system becomes the first aperture value, and the photographing mode switching unit switches to the second photographing mode, and the image display unit displays the first image taken that is obtained by the imaging unit on the first display region. Furthermore, the aperture setting unit adjusts the aperture so that the aperture value of the imaging optical system becomes the second aperture value, and the image display unit displays the second image taken that is obtained by the imaging unit on the second display region.

In this camera system, in the case that the mode is set to the depth-of-field preview mode, the aperture setting unit adjusts the aperture so that the aperture value of the imaging optical system becomes the first aperture value, and the photographing mode switching unit switches to the second photographing mode, and the image display unit displays the first image taken that is obtained by the imaging unit on the first display region. Furthermore, the aperture setting unit adjusts the aperture so that the aperture value of the imaging optical system becomes the second aperture value, and the image display unit displays the second image taken that is obtained by the imaging unit on the second display region. Therefore, by concurrently displaying a plurality of actual aperture live view images with aperture values at the time when actually photographing simultaneously on the display region of the image display unit, it is possible to easily compare images taken with different depths of field, and it is possible to photograph images taken with different depths of field, with one photographing operation.

A fifth aspect of the present invention is that of the fourth aspect of the present invention, and that a camera body that includes the imaging unit, the observing optical system, the movable mirror, the photographing mode switching unit, the depth-of-field preview mode setting unit, the image display unit, and the image recording unit; and an interchangeable lens unit that includes the imaging optical system and the aperture setting unit are further comprised.

As a result, it is possible to form a camera system using the camera body and the interchangeable lens unit, which are separate parts.

A sixth aspect of the present invention is that of one of any of the first to the fifth aspects of the present invention, and that the image display unit includes a memory that stores the first image taken, and displays the first image taken that is stored in the memory on the first display region, and displays the image taken that is obtained by the imaging unit on the second display region.

As a result, while the image taken corresponding to a predetermined aperture value is being displayed in the first display region, since it is possible to display the image taken corresponding to a different aperture value in the second display region, the user can easily find out the change in the images taken that is due to the change in the aperture value.

A seventh aspect of the present invention is that of the sixth aspect of the present invention, and that the first image taken is the image taken that is obtained at the imaging unit in the case that the aperture is opened.

As a result, a user can find out the change in the image taken due to the change in the aperture value while comparing it with the image taken in which the aperture is opened.

An eighth aspect of the present invention is that of one of any of the first to the seventh aspects of the present invention, and that the image display unit includes the display region that includes a third display region that is being corresponded with the first display region, and a fourth display region that is being corresponded with the second display region, and the image display unit displays the aperture value at the time that the first image taken is obtained on the third display region with the displaying of the first image taken in the first display region, and the image display unit displays the aperture value at the time that the second image taken is obtained on the fourth display region with the displaying of the second image taken in the second display region.

As a result, it is possible to easily check the relationship between an image taken and the aperture value at the time in which the image taken is obtained on the display region of the image display unit.

In addition, here, "being corresponded with" means that the display regions that correlate with each other exist within a certain region in the display region of the image display unit, and refers to the state in which a user is able to confirm the correlation thereof easily by looking at the display region of the image display unit. For example, the center portion of the display region is divided into left and right portions, and the first image taken is displayed on the left side, and the display region on top of it is the display region that is being corresponded with, on which the aperture value at the time that the first image taken is obtained is displayed. And, the second image taken is displayed on the right side, and the display region on top of it is the display region that is being corresponded with, on which the aperture value at the time that the second image taken is obtained is displayed.

A ninth aspect of the present invention is a camera body that is used in a camera system with an interchangeable lens unit that includes an imaging optical system that has an aperture and focuses the light from a subject, and an aperture setting unit that adjusts the aperture and sets the aperture value of the imaging optical system. And, the ninth aspect of the present invention includes an imaging unit, an observing optical system, a movable mirror, a photographing mode switching unit, a depth-of-field preview mode setting unit, an imaging unit for converting the light from the imaging optical system into an electrical signal to obtain an image taken, an observing optical system for observing the light from the imaging optical system, an image display unit, and an image recording unit. The observing optical system is arranged between the imaging optical system and the imaging unit, and it is for leading the light from the imaging optical system to the observing optical system. The movable mirror is able to be in a first position, and a second position for leading the light from the imaging optical system to the imaging unit. The photographing mode switching unit switches between a first photographing mode in which an image is taken with the position of the movable mirror being arranged in the first position, and a second photographing mode in which an image is taken with the position of the movable mirror being arranged in the second position. The depth-of-field preview mode setting unit is a unit in which information for setting the mode to a depth-of-field preview mode is inputted. The image display unit includes a display region including a first display region and a second display region, and displays an image taken that is obtained at the imaging unit on the display region. The image recording unit records the image taken. And, the image display unit displays a first image taken that is obtained by the imaging unit on the first display region in the case that the aperture value is set to be a first aperture value by the aperture setting unit, and displays a second image taken that is obtained by the imaging unit on the second display region in the case that the aperture value is set in a second aperture value by the aperture setting unit, and by doing so, displays both the first image taken and the second image taken on the display region. The image recording unit records the first image taken and the second image taken.

With this camera body, a user is able to take a picture while looking at the image to be taken that is displayed on the display region of the image display unit, and by concurrently displaying a plurality of actual aperture live view images with aperture values at the time of actually photographing simultaneously on the display region of the image display unit, it is possible to easily compare the images taken with different depths of field.

In addition, with this camera body, it is possible to achieve a camera body that forms a camera system with an interchangeable lens unit.

A tenth aspect of the present invention is an interchangeable lens unit that includes an imaging optical system that has an aperture and focuses the light from a subject, and an aperture setting unit that adjusts the aperture and sets the aperture value of the imaging optical system. And, the tenth aspect of the present invention is used in a camera system with a camera body that includes an imaging unit for converting the light from the imaging optical system into an electrical signal to obtain an image taken; an observing optical system for observing the light from the imaging optical system; a movable mirror that is arranged between the imaging optical system and the imaging unit, and is able to be in a first position for leading the light from the imaging optical system to the observing optical system, and a second position for leading the light from the imaging optical system to the imaging unit; a photographing mode switching unit that switches between a first photographing mode in which an image is taken with the position of the movable mirror being arranged in the first position, and a second photographing mode in which an image is taken with the position of the movable mirror being arranged in the second position; a depth-of-field preview mode setting unit in which information for setting the mode to a depth-of-field preview mode is inputted; an image display unit that includes a display region including a first display region and a second display region, and displays an image taken that is obtained at the imaging unit on the display region; and an image recording unit that records the image taken.

In this interchangeable lens unit, it is possible to form a camera system with a camera body, and in this camera system in which the interchangeable lens unit is used, a user is able to take a picture while looking at the image to be taken that is displayed on the display region of the image display unit, and by concurrently displaying a plurality of actual aperture live view images with aperture values at the time of actually photographing simultaneously on the display region of the image display unit, it is possible to easily compare images taken with different depths of field.

An eleventh aspect of the present invention is an imaging method in a camera system that includes an imaging optical system that has an aperture and focuses the light from a subject, an imaging unit for converting the light from the imaging optical system into an electrical signal to obtain an image taken, an image display unit that includes a display region including a first display region and a second display region and displays an image taken that is obtained at the imaging unit on the display region, and an aperture setting unit that adjusts the aperture and sets the aperture value of the imaging optical system. And, the eleventh aspect of the present invention includes an imaging step in which the light from the imaging optical system is converted into an electrical signal and an image taken is obtained, an image display step in which an image taken that is obtained at the imaging step is displayed on the display region, and an aperture setting step in which the aperture is adjusted and the aperture value of the imaging optical system is set. In the image display step, a first image taken that is obtained by the imaging step is displayed on the first display region in the case that the aperture value is set to be a first aperture value by the aperture setting step, and a second image taken that is obtained by the imaging step is displayed on the second display region in the case that the aperture value is set in a second aperture value by the aperture setting step, and by doing so, both the first image taken and the second image taken are displayed on the display region.

In this imaging method, the light from the subject is focused by the imaging optical system that includes the aperture, and is converted by the imaging unit into an image that is taken. The converted image that is taken is displayed on the display region that includes the first display region and the second display region by the image display unit. In addition, in this imaging method, it is possible to set the aperture value of the imaging optical system via the aperture setting step. In the case that the aperture value is set in a first aperture value via the aperture setting step, the first image taken that is obtained via the imaging step is displayed on the first display region via the image display step. In the case that the aperture value is set in a second aperture value via the aperture setting step, the second image taken that is obtained via the imaging step is displayed on the second display region via the image display step. Therefore, it is possible to display both the first image taken and the second image taken on the display region of the image display unit.

As a result, it is possible for a user to take a picture while looking at the image to be taken that is displayed on the display region of the image display unit. And, by concurrently displaying a plurality of actual aperture live view images with aperture values at the time of actually photographing simultaneously, it is possible to easily compare images taken with different depths of field.

Advantageous Effects

With the present invention, it is possible to achieve a camera system and an image method that is possible for a user to take a picture while looking at a liquid crystal display monitor for displaying an image, and possible to easily compare images with different depths of fields, by concurrently displaying a plurality of actual aperture live view images with aperture values at the time of actually photographing simultaneously on the liquid crystal display monitor for displaying an image, and possible to achieve a camera body and an interchangeable lens unit that are used in this camera system.

EXPLANATION OF REFERENCE

Figure 1:
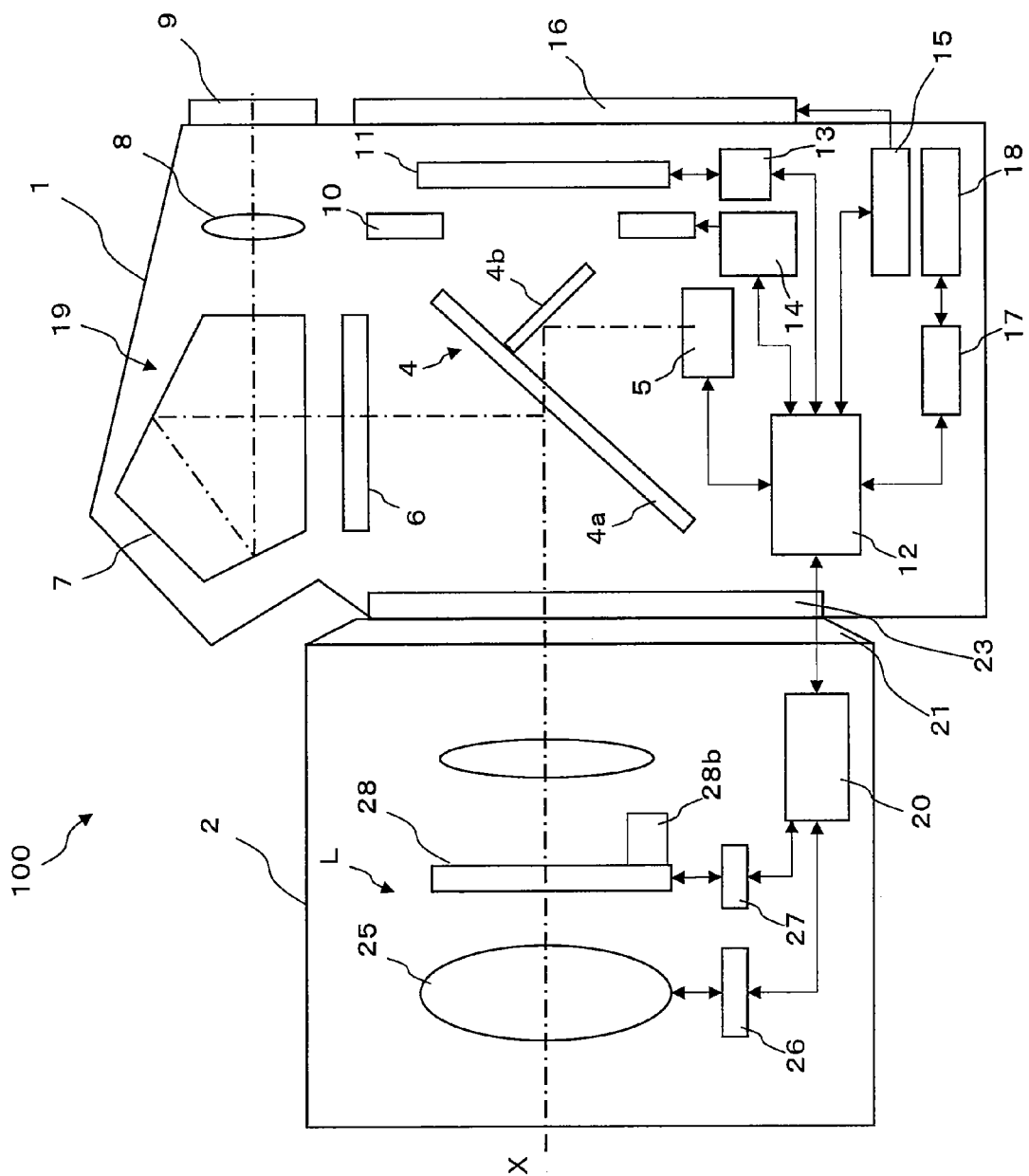
FIG. 1 is a block diagram showing the control system of an interchangeable lens unit and a digital camera body according to a first embodiment of the present invention.

L Imaging optical system
Df Defocus amount
X Optical path
1 Digital camera
2 Interchangeable lens unit
4 Quick return mirror
9 Viewfinder eyepiece window
10 Shutter unit
11 Imaging sensor
12 Body microcomputer
14 Shutter control unit
15 Image display control unit
16 Liquid crystal display monitor for displaying an image
18 Image reading/recording unit (image recording unit)
20 Lens microcomputer
21 Lens mount
23 Body mount
25 Focus lens group
27 Aperture control unit
28 Aperture unit
28a Aperture blade
28b Aperture drive motor
30 Release button
31 Shutter speed setting dial
33 Index
38 Zoom ring
39 Focus ring
40 Aperture ring
41 Aperture linear sensor
60 Quick return mirror control unit
61 Quick return mirror drive motor
62 Zoom control unit
65 Focus drive motor
71 Photographing/reproducing mode switching lever
72 MENU button 75 Photographing mode switching button
76 Depth-of-field preview mode button

BEST MODE FOR CARRYING OUT THE INVENTION

First Embodiment

Below, an embodiment of the present invention will be described while referring to the drawings.
<1: Overall Configuration of a Camera System>
A camera system 100 according to a first embodiment of the present invention will be described. FIG. 1 shows a diagram of the overall configuration of the camera system 100 according to the first embodiment of the present invention.

The camera system 100 that is shown in FIG. 1 is a system of a single-lens reflex digital camera of an interchangeable lens type. The camera system 100 includes a camera body 1 and an interchangeable lens unit 2.

In addition, the camera system 100 and the interchangeable lens unit 2 perform communication of various control signals via an electrical segment 22 (not shown in the figure) of a lens mount 21 on the side of the interchangeable lens unit 2, and an electrical segment 24 (not shown in the figure) of a body mount 23 on the side of the camera system 100 that are arranged on each of them.

(1.1: Configuration of the Interchangeable Lens Unit)
The interchangeable lens unit 2 is mainly made of an imaging optical system L for connecting a subject image to an imaging sensor 11 in the camera system 100, an aperture setting unit for adjusting an aperture of the imaging optical system L, and a lens microcomputer 20 that controls various sequences of the interchangeable lens unit 2.

The interchangeable lens unit 2 includes a lens mount 21, and is mounted detachably on the body mount 23 that is arranged on the front side of the body of the camera body 1.

The detachable interchangeable lens unit 2 includes the imaging optical system L for producing a subject image on the imaging sensor 11 in the camera system 100. In addition, a lens microcomputer 20 is equipped to control various sequences and keep various lens information in the interchangeable lens unit 2. A focus control unit 26 is equipped in the interchangeable lens unit 2 to drive and control a focus lens group 25. Furthermore, an aperture control unit 27 that controls the aperture unit 28 is equipped.

The imaging optical system L mainly includes a focus lens group 25 and an aperture unit 28.

The aperture setting unit mainly includes an aperture ring 40 that a user is able to input an aperture value by a rotating operation, an aperture linear sensor 41 that outputs a physical value according to the rotation angle of the aperture ring 40, an aperture drive motor 28b that drives an aperture blade, and an aperture control unit 27 that adjusts the aperture to become the aperture value that is being set.

The lens microcomputer 20 is a control device for achieving main functions of the interchangeable lens unit 2 and is connected to each portion equipped in the interchangeable lens unit 2, and controls various sequences of the interchangeable lens unit 2. In the lens microcomputer 20, for example, a CPU and a memory 69 are equipped, and it is possible to achieve various functions by having the CPU read a program that is stored in the memory 69. The lens microcomputer 20 makes each of the focus control unit 26, the aperture control unit 27, a shift control unit 47 and the like execute the control thereof, by outputting commands (for example, a control signal, a command) to the focus control unit 26, the aperture control unit 27, the shift control unit 47, and the like. In addition, the lens microcomputer 20 is connected to the body microcomputer 12 via an interface, and communicates with the body microcomputer 12.

(1.2: Configuration of the Camera Body)
The camera body 1 mainly includes a quick return mirror 4 that changes the pathway of a light from a subject, a viewfinder optical system 19 for viewing a subject image, a focus detection unit 5 that performs focus detection, a shutter unit 10 that performs the opening and closing operation of the shutter, an imaging unit that obtains a subject image as the photographed image, an image display unit that displays the image taken, a photographing mode switching unit that switches the photographing mode, a depth-of-field preview mode setting unit for setting into a depth-of-field preview mode, a shutter control unit 14 that controls the shutter unit 10, an image recording unit 18 that records the image taken, and the body microcomputer 12 that controls various sequences of the camera body 1.

In addition, the viewfinder optical system 19 forms the observing optical system. The quick return mirror 4 forms a movable mirror. A photographing mode switching button and the body microcomputer forms the photographing mode switching unit. A depth-of-field preview mode button and the body microcomputer form the depth-of-field preview mode setting unit. The subject light that passed through the interchangeable lens unit 2 is divided into two light beams (a reflecting light beam and a transmitting light beam) by the main mirror 4a of the quick return mirror 4. The reflecting light beam is led to the viewfinder optical system 19. On the other hand, the transmitting light beam is reflected by a sub mirror 4b that is arranged on the rear side of the quick return mirror 4, and is used as an AF light beam of the focus detection unit 5. Normally, in this focus detection unit 5, a phase difference detection system is used.

The light beam that is reflected by the main mirror 4a forms an image on a viewfinder screen 6. The subject image that is formed on the viewfinder screen 6 can be observed from a viewfinder eyepiece window 9 via a pentaprism 7 and an eyepiece 8.

In the camera system 100, the body microcomputer 12 is equipped for controlling various sequences. An imaging sensor control unit 13 controls driving of the imaging sensor 11. A shutter control unit 14 controls driving of the shutter unit 10. An image display control unit 15 for displaying an image reads out an image data by the imaging sensor 11, and controls the photographed image to display on a liquid crystal display monitor 16 for displaying an image, after a predetermined image process is performed. In addition, an image recording control unit 17 reads and writes the photographed image to a recording media such as a SD card and the like, not shown in the figure, via an image reading recording unit 18 (hereinafter referred to as "image recording unit 18").

The quick return mirror 4 is mainly made of the main mirror 4a that is able to reflect an incident light and make an incident light pass through, and a sub mirror 4b that is arranged on the rear side of the main mirror 4a and reflects the light that is transmitted through from the main mirror 4a, and the quick return mirror 4 is flipped out of an optical path X by a quick return mirror control unit 60. The quick return mirror 4 is arranged to be able to move into a position shown in FIG. 2, and a position shown in FIG. 3. In addition, the incident light is divided into two light beams by the main mirror 4a, and the reflected light beam is led to the viewfinder optical system 19 and the transmitted light beam is reflected by the sub mirror 4b and led to the focus detection unit 5.

The viewfinder optical system 19 mainly includes the viewfinder screen 6 on which a subject image forms, a pentaprism 7 that converts the subject image into an erected image, an eyepiece 8 that leads the erected image of the subject to the viewfinder eyepiece window 9, and the viewfinder eyepiece window 9 through which an user observes a subject image.

The focus detection unit 5 is a unit for detecting whether or not the image formed by the light from the subject is in a focused state (detecting the focal point) by the reflected light from the sub mirror 4b. For example, focus detection is performed by a common phase difference detection system.

The imaging unit is mainly comprised of the imaging sensor 11 such as a CCD and the like that performs photoelectric conversion, and the imaging sensor control unit 13 that controls the imaging sensor 11, and it obtains the subject image as the photographed image. The subject image by the incident light is converted by the imaging unit into an electrical signal that forms the photographed image.

The image display unit has the liquid crystal display monitor 16 for displaying an image, and an image display control unit 15 that controls the operation of the liquid crystal display monitor 16 that is used for displaying an image. The liquid crystal display monitor 16 for displaying an image includes a display region R130 that includes a first display region R131 and a second display region R132, and displays the image that is obtained by the imaging unit on the display region RI 30.

The image recording unit 18 performs, for example, the recording of the photographed image on a card type of recording media, not shown in the figure, and the reproducing of the photographed image. The image recording unit 18 is controlled by an image recording control unit 17 that controls the operation of the image recording unit 18.

The body microcomputer 12 is a control device for achieving main functions of the camera body 1, and it controls various sequences. In the body microcomputer 12, for example, a CPU, a ROM, and a RAM are equipped, and by having the CPU read programs that are stored in the ROM, the body microcomputer 12 is able to achieve various functions. The body microcomputer 12 makes each of the shutter control unit 14, the imaging sensor control unit 13, the image display control unit 15, the image recording control unit 17, and the like execute the control thereof, by outputting commands (for example, a control signal, a command) to the shutter control unit 14, the imaging sensor control unit 13, the image display control unit 15, the image recording control unit 17, and the like. In addition, the body microcomputer 12 is connected to the lens microcomputer 20 via an interface, and communicates with the lens microcomputer 20.

(1.3: Viewfinder Photographing Mode and Monitor Photographing Mode)

This camera system 100 has two photographing modes. The first mode is a viewfinder photographing mode in which a user and the like takes a picture while observing through the viewfinder eyepiece window 9, and it is the normal photographing mode in a conventional single-lens reflex camera.

Figure 2:
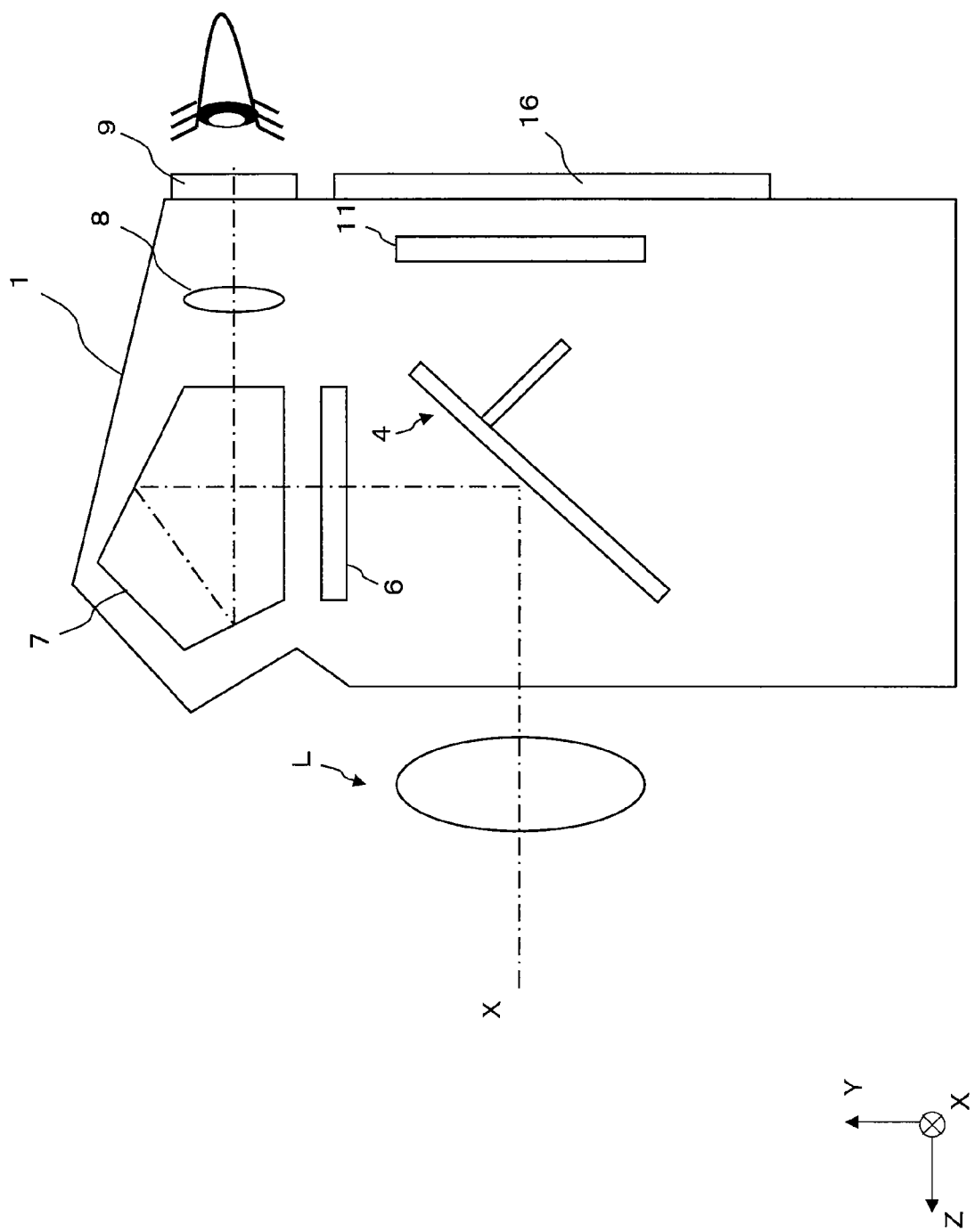
FIG. 2 is a conceptual diagram for describing a viewfinder photographing mode according to the first embodiment of the present invention.

In this viewfinder photographing mode, as shown in FIG. 2, the quick return mirror 4 is arranged on a predetermined position on the optical path X, and the subject light is let to the viewfinder optical system 19. Therefore, a user and the like is able to observe the subject image from the viewfinder eyepiece window 9. During the time when actually photographing, the quick return mirror 4 is flipped to be outside the optical path X and the shutter unit 10 is opened, and the subject image is formed on the imaging surface of the imaging sensor 11.

Figure 3:
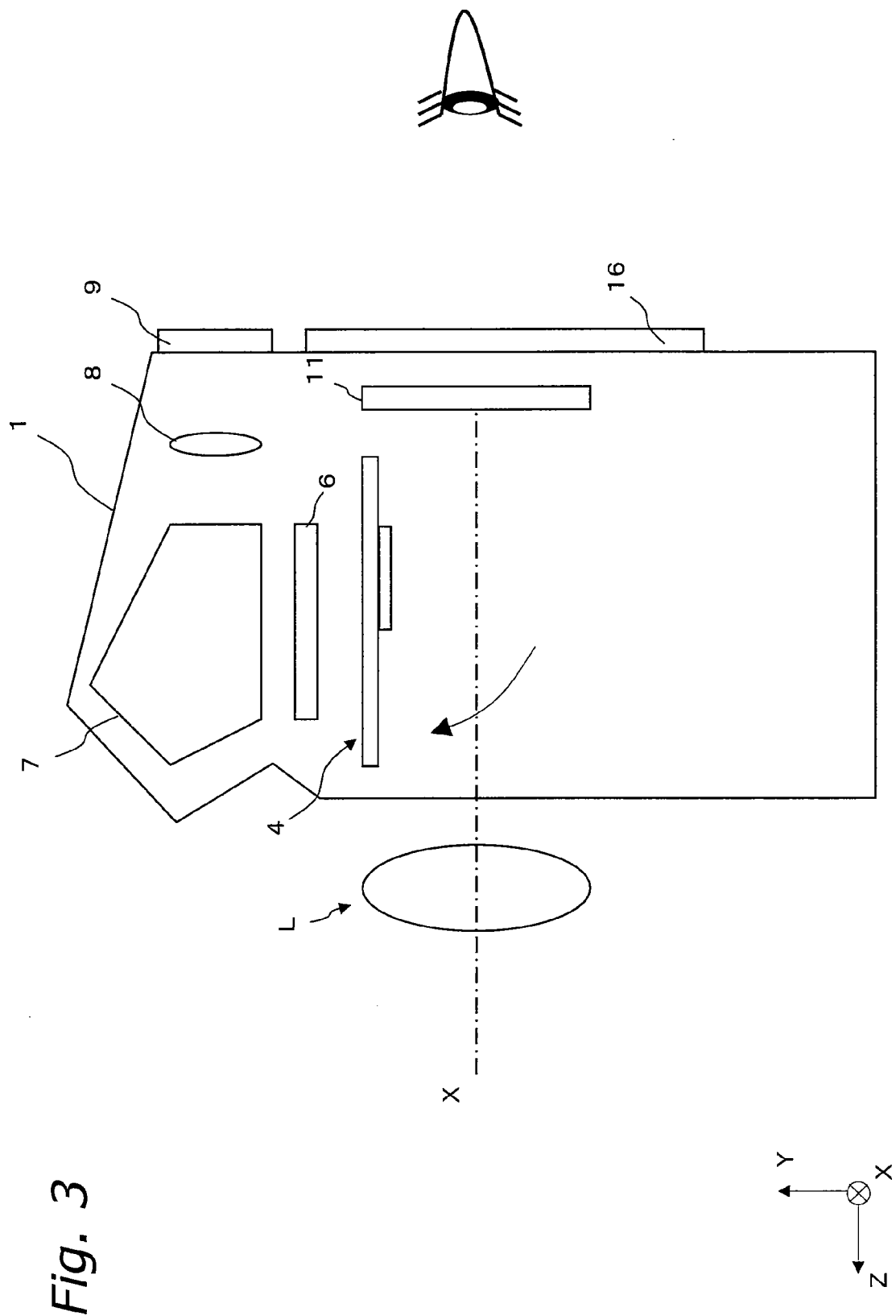
FIG. 3 is a conceptual diagram for describing a monitor photographing mode according to the first embodiment of the present invention.

Meanwhile, in a second mode which is a monitor photographing mode, as shown in FIG. 3, the quick return mirror 4 is retracted from the optical path X. Consequently, on the liquid crystal display monitor 16 that is used for displaying an image, the image of the subject, the so-called through image, is displayed via the imaging sensor 11.

(1.4: Configuration of the Upper Portion of the Interchangeable Lens Unit)

Figure 4:
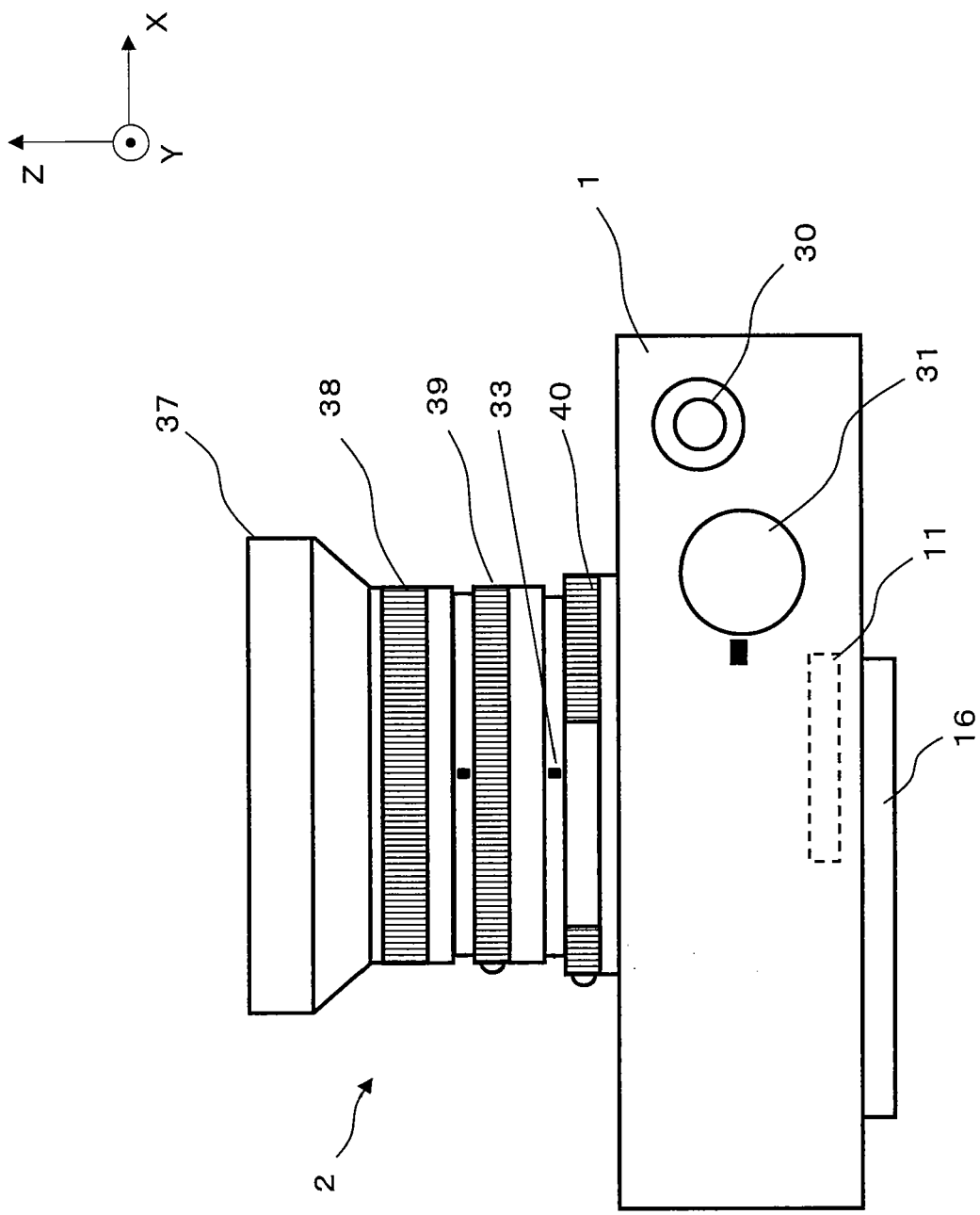
FIG. 4 is a top view of a digital camera according to the first embodiment of the present invention.

FIG. 4 is a top view of the camera system 100 with the interchangeable lens unit 2 mounted, according to the first embodiment of the present invention. In addition, as shown in FIG. 4, an X axis, a Y axis, and a Z axis are created (the Z axis created to be parallel to the optical axis of the lenses that form the imaging optical system L).

The camera system 100 includes a chassis that is supported by a user and the like at the time of photographing a subject. This camera system 100 includes a release button 30, and a shutter speed setting dial 31. The release button 30 and the shutter speed setting dial 31 are arranged on the right side on the top of the digital camera body 1.

The shutter speed setting dial 31 is a member that is operated to set the shutter speed, by a rotating operation. In addition, the shutter speed setting dial 31 has an automatic position in which the shutter speed is automatically set.

In addition, the body of the camera system 100 includes the liquid crystal display monitor 16 that is used for displaying an image. The liquid crystal display monitor 16 that is used for displaying an image is arranged on the surface on the side of the user and the like on the body of the camera system 100. The effects of the liquid crystal display monitor 16 for displaying an image will be described later.

The interchangeable lens unit 2 has a filter mount 37 on the side nearest the subject (the positive side in the Z axis direction). The interchangeable lens unit 2 includes a zoom ring 38, a focus ring 39, and an aperture ring 40, in order from the filter mount 37 towards the side of body of the camera system 100 (the negative direction in the Z axis). All of the zoom ring 38, the focus ring 39, and the aperture ring 40 are members in the cylindrical shape that are operated by rotation, and arranged to be able to rotate on the outer circumferential surface of the interchangeable lens unit 2.

(1.5: Configuration of the Rear Side of the Camera Body)

Figure 5:
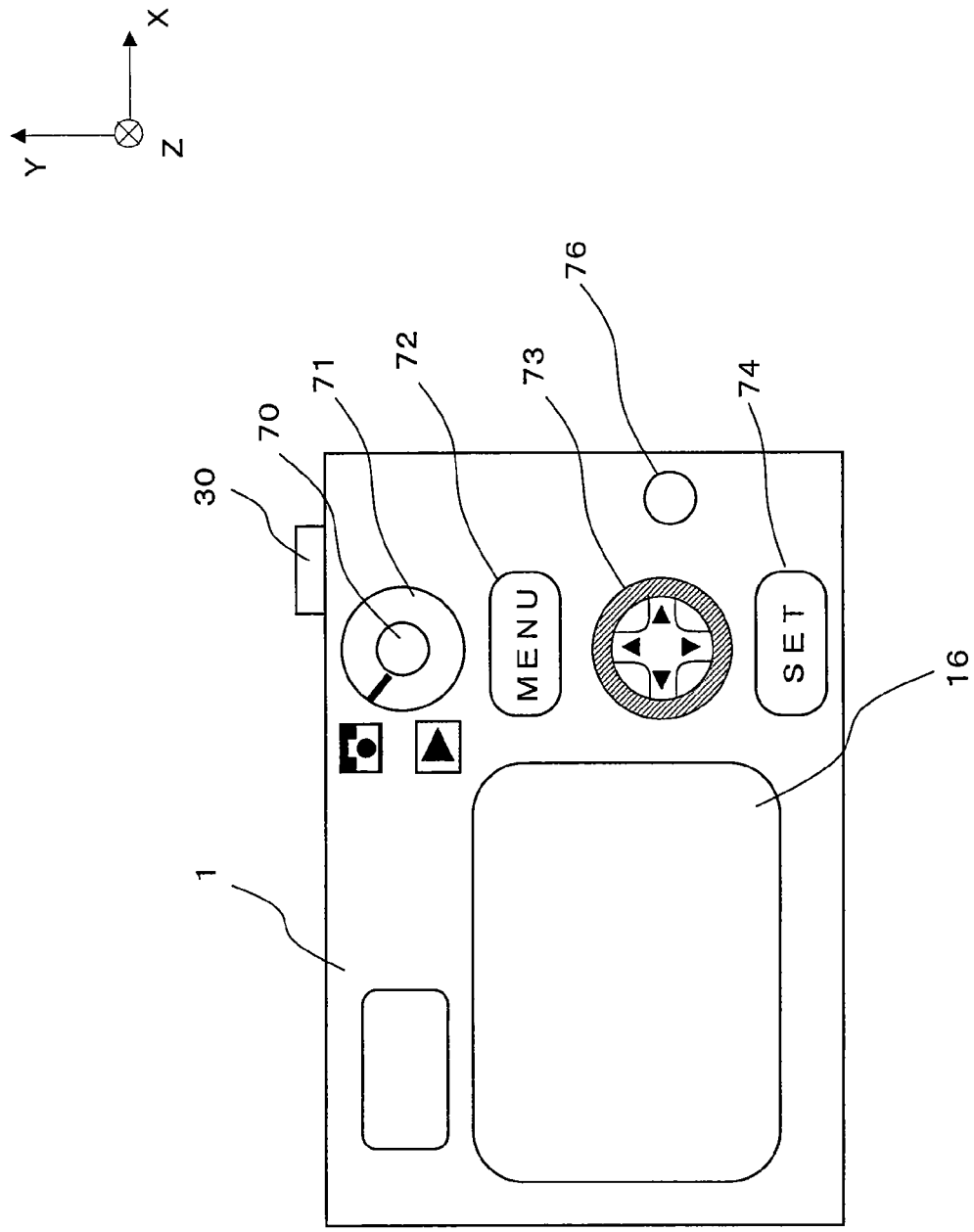
FIG. 5 is a rear side elevation of the digital camera according to the first embodiment of the present invention.

FIG. 5 is a rear view of the camera system 100 according to the first embodiment of the present invention. The body of the camera system 100 includes a power button 70, a photographing/reproducing mode switching lever 71, a MENU button 72, a cross-shaped operation key 73, a SET button 74, and a depth-of-field preview mode button 76.

The power button 70 is a member that is operated to perform the ON/OFF of the power of the camera system 100. The photographing/reproducing mode switching lever 71 is a member that is operated to switch between a photographing mode and a reproducing mode by switching the lever. Here, the photographing mode is a mode that is set in the camera system 100 for newly taking a picture of a subject and turning it into an image signal. In addition, the reproducing mode is a mode that is set in the camera system 100 for displaying an image signal that has already been photographed and stored.

The MENU button 72 is a member that is operated for displaying various operation menus on the liquid crystal display monitor 16 that is used for displaying an image. The cross-shaped operation key 73 has up and down, and left and right arrow keys, and is a member that is operated for selecting a displayed item on the various operation menus. The SET button 74 is a member that is operated for deciding on a displayed item on the various operation menus.

The depth-of-field preview button 76 is a button for changing into a depth-of-field preview mode to be described later.

In the camera system 100, a user presses this depth-of-field preview button 76 to change to the depth-of-field preview mode.

(1.6: Aperture)

Figure 6A:
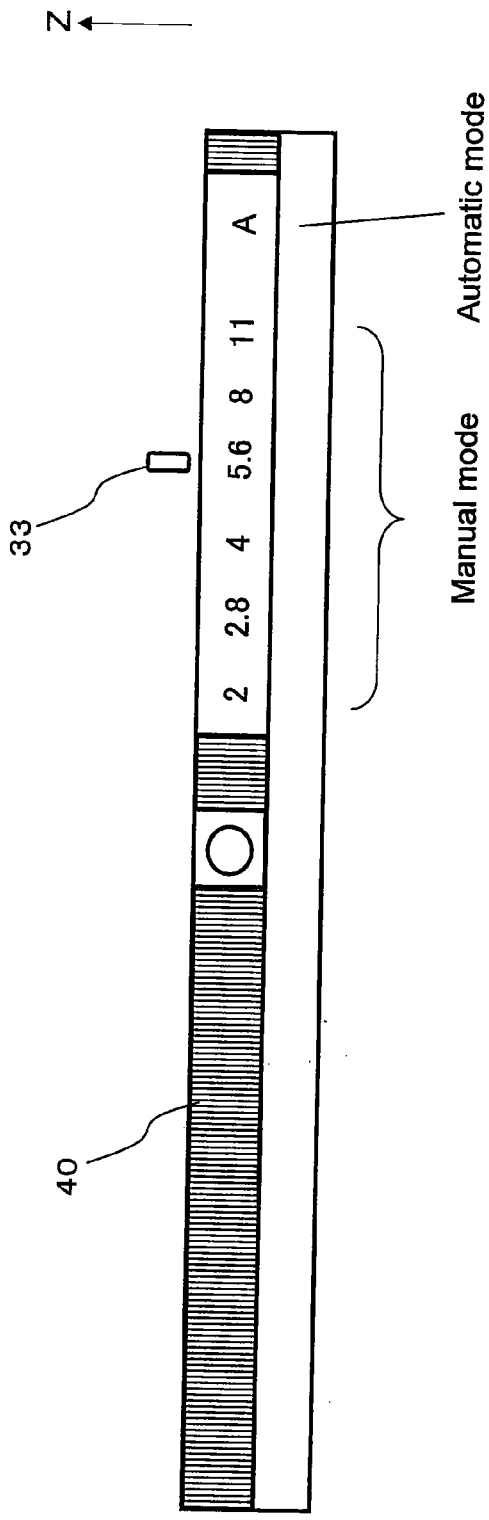
FIG. 6A is an expansion plan of the outer circumference surface of an aperture ring according to the first embodiment of the present invention.
Figure 6B:
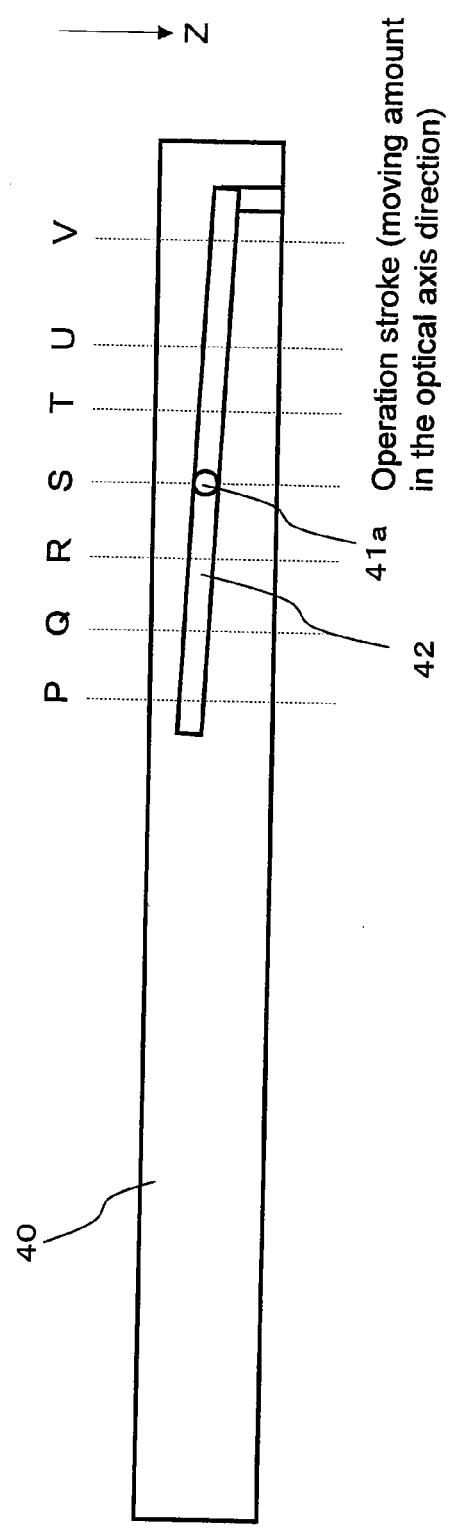
FIG. 6B is an expansion plan of the inner circumference surface of the aperture ring according to the first embodiment of the present invention.

The aperture ring 40 is in a cylindrical shape. FIG. 6A is an expansion plan of the outer circumferential surface of the aperture ring according to the first embodiment of the present invention, and FIG. 6B is an expansion plan of the inner circumferential surface of the aperture ring according to the first embodiment of the present invention.

As shown in FIGS. 4 and 6A, aperture values are shown on the outer circumferential surface of the aperture ring 40. The display region of the aperture values are divided into two regions. In FIG. 6A, the displaying portion of every 1 AV (Aperture Value) from "2" to "11" corresponds to the aperture values of the manual region. In addition, in FIG. 6A, the displaying portion of "A" corresponds to the aperture value of the automatic region. As shown in FIGS. 4 and 6B, the aperture ring 40 has a linear cam groove 42 on the inner circumferential surface thereof. In addition, the aperture values are not limited to a selection out of each of the 1 AV values.

In addition, the interchangeable lens unit 2 has an aperture unit 28 in the interior thereof. The aperture unit 28 includes an aperture drive motor 28b for driving an aperture blade (not shown in the figure) in the interior thereof. The aperture drive motor 28b drives the aperture blade according to the rotation angle of the aperture ring 40 by a control that will be described later. The aperture value of the imaging optical system L is changed by this aperture blade being driven.

Figure 7:
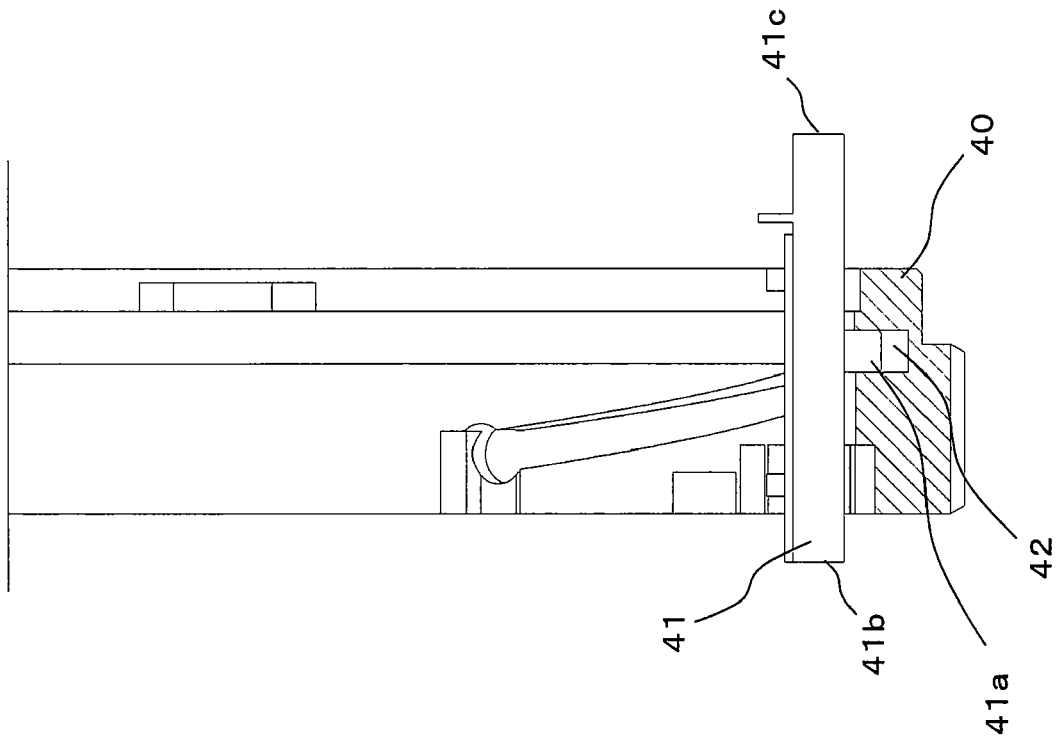
FIG. 7 is a partial cross sectional view that shows the joining of the aperture ring and an aperture linear sensor according to the first embodiment of the present invention.

FIG. 7 is a partial section view showing the joining of the aperture ring 40 and an aperture linear sensor 41 according to the first embodiment of the present invention. The aperture linear sensor 41 includes a cylindrical shaped wiper 41a that protrudes out in the radius direction of the aperture ring 40. The cam groove 42 that is formed on the aperture ring 40 joins with the wiper 41a of the aperture linear sensor 41.

Figure 8B:
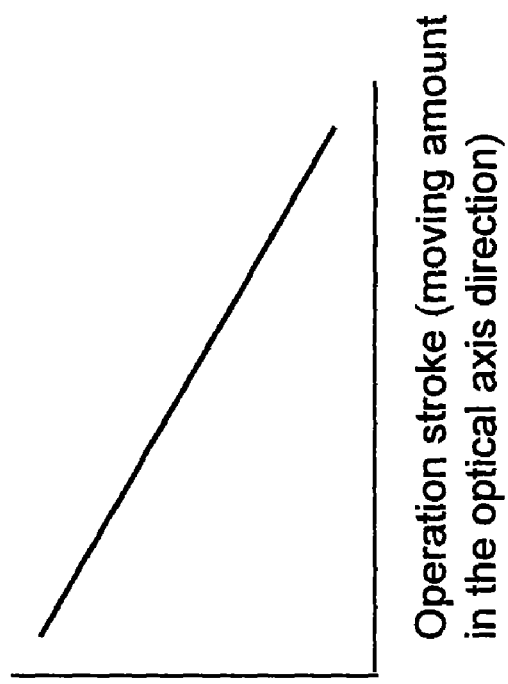
FIG. 8B is a graph that shows the output of the aperture linear sensor of the lens barrel in the first embodiment of the present invention.
Figure 8A:
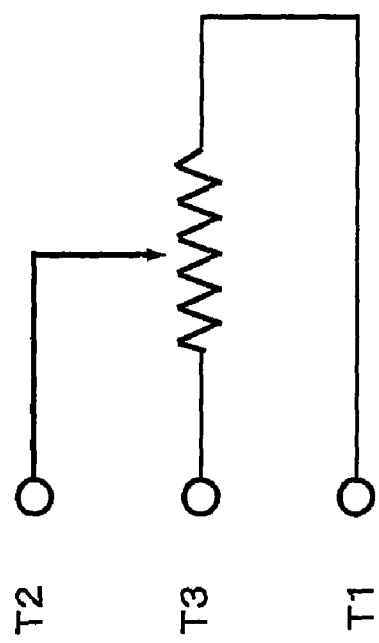
FIG. 8A is a circuit diagram of the aperture linear sensor of a lens barrel in the first embodiment of the present invention.

This aperture linear sensor 41 is mainly made of a circuit that has a variable resistor, as shown in FIG. 8A. The terminal T2 in FIG. 8A is connected to the wiper 41a in FIG. 7, and terminals T2 and T3 are each connected to the two end portions 41b and 41c of the aperture linear sensor in FIG. 7. If a predetermined voltage is added between terminals T1 and T3, and by the sliding of the cylindrical shaped wiper 41a arranged on the aperture linear sensor 41 on a magnetoresistive element (not shown in the figure) in the interior of the aperture linear sensor 41, the output (output voltage) of the terminal T2 linearly changes, as shown in FIG. 8B.

Figure 9:
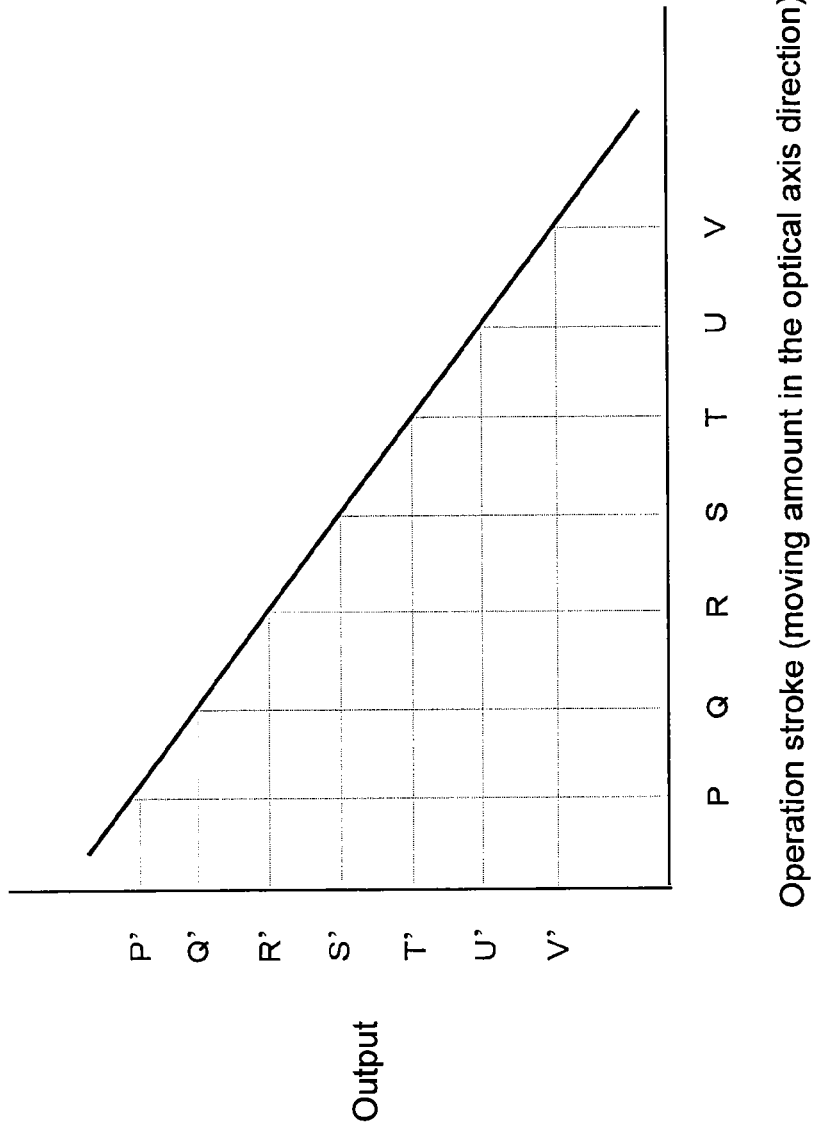
FIG. 9 is a graph that shows the relationship between the rotation angle of the aperture ring and the output value of the aperture linear sensor according to the first embodiment of the present invention.

FIG. 9 is a graph that shows the relationship between the rotation angle of the aperture ring 40, and the output value (output voltage value) of the aperture linear sensor 41 according to the first embodiment of the present invention. In FIGS. 4 and 6, in the case that the position where the character "2" shown on the aperture ring 40 is matched with the position of an index 33, by rotating the aperture ring 40, the wiper 41a of the aperture linear sensor 41 is in the position P on the cam groove 42. In that case, the output value (output voltage value) of the aperture linear sensor 41 becomes P'. In other words, the output voltage value of the aperture linear sensor 41 that corresponds to the rotation angle of the aperture ring 40, when the position of the character "2" shown on the aperture ring 40 is matched with the position of the index 33, becomes P'.

Likewise, when the positions of the characters "2.8", "4", "5.6", "8", "11", and "A" that are shown on the aperture ring 40 are matched with the position of the index 33, by rotating the aperture ring 40, the position on the cam groove 42 of the wiper 41a of the aperture linear sensor 41 are positions Q, R, S, T, U, and V, respectively. In that case, the output value (output voltage value) of the aperture linear sensor 41 becomes Q', R', S', T', U', and V', respectively. In other words, the output voltage value of the aperture linear sensor 41 that corresponds to the rotation angle of the aperture ring 40 becomes Q', R', S', T', U', and V', respectively, if the positions where the characters "2.8", "4", "5.6", "8", "11", and "A" are shown on the aperture ring 40 are matched with the position of the index 33.

In this way, the aperture linear sensor 41 shows an output (output voltage value) that corresponds one on one to the rotation angle of the aperture ring 40. Therefore, it is possible to detect the rotation angle of the aperture ring 40 by the aperture linear sensor 41. The aperture linear sensor 41 outputs an aperture value signal according to the rotation angle as a voltage change.

(1.7: Control System of the Camera Body)

Figure 10:
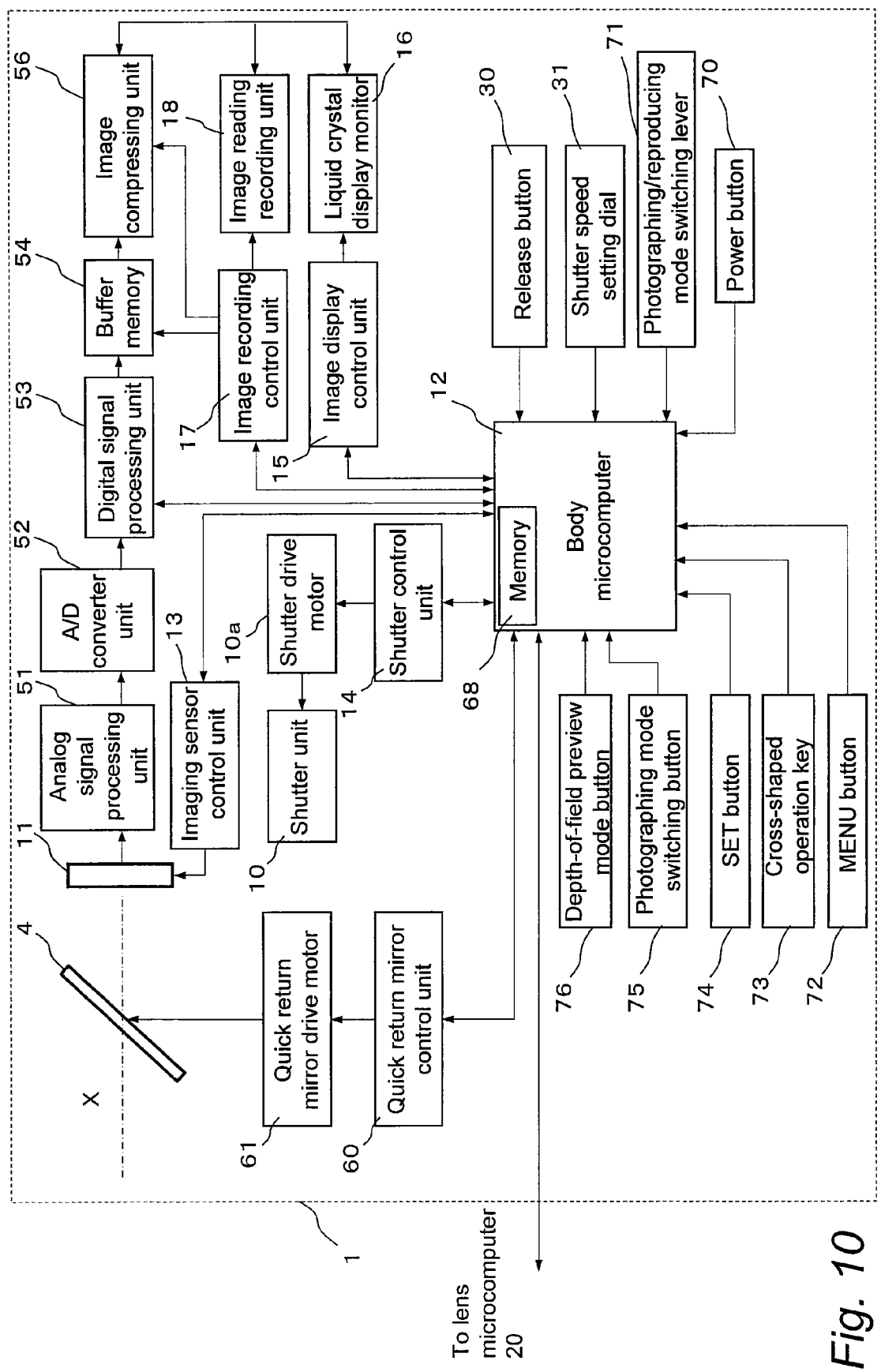
FIG. 10 is a block diagram that shows the control system in the interior of the digital camera according to the first embodiment of the present invention.

FIG. 10 is a block diagram that shows the control system of the camera system 100 according to the first embodiment of the present invention.

The body microcomputer 12 is able to receive signals from the release button 30, the shutter speed setting dial 31, the photographing/reproducing mode switching lever 71, the MENU button 72, the cross-shaped operation key 73, the SET button 74, the photographing mode switching button 75, and the depth-of-field preview mode button 76. In addition, the body microcomputer 12 is able to send signals to the shutter control unit 14 and the quick return mirror control unit 60. Furthermore, the body microcomputer 12 is able to perform two-way communication between the body microcomputer 12 and the image recording control unit 17, two-way communication between the body microcomputer 12 and the image display control unit 15, and two-way communication between the body microcomputer 12 and a digital signal processing unit 53. In addition, the body microcomputer 12 has a memory 68 that stores signals.

The shutter control unit 14 drives the shutter drive motor 10a based on a control signal from the body microcomputer 12. The quick return mirror control unit 60 drives the quick return mirror drive motor 61 based on a control signal from the body microcomputer 12.

The release button 30 sends information that shows the shutter timing to the body microcomputer 12. The shutter speed setting dial 31 sends the shutter speed information and the shutter mode information that has been set.

The imaging sensor 11 is made of a CCD (Charge Coupled Device) and the like. The imaging sensor 11 converts the optical image that is formed by the imaging optical system L of the interchangeable lens unit 2 into an electrical image signal. The imaging sensor 11 is driven and controlled by the imaging sensor control unit 13. The image signal outputted from the imaging sensor 11 is processed in order by an analog signal processing unit 51, an A/D converter unit 52, a digital signal processing unit 53, a buffer memory 54, and an image compressing unit 56.

The image signal is sent from the imaging sensor 11 to the analog signal processing unit 51. The analog signal processing unit 51 performs analog signal processing such as gamma processing and the like to the image signal that the imaging sensor 11 outputs. The image signal outputted from the analog signal processing unit 51 is sent to the A/D converter unit 52. The A/ID converter unit 52 converts the analog image signal outputted form the analog signal processing unit 51 into a digital signal.

The image signal outputted from the A/D converter unit 52 is sent to the digital signal processing unit 53. The digital signal processing unit 53 performs a digital signal processing such as noise reduction, edge enhancement, and the like, with respect to the image signal that is converted into a digital signal by the A/D converter unit 52. The image signal outputted from the digital signal processing unit 53 is sent to the buffer memory 54. The buffer memory 54 once stores the image signal that is processed by the digital signal processing unit 53. The buffer memory 54 is made of a RAM (Random Access Memory) and the like.

The image signal outputted from the buffer memory 54 is sent to the image compressing unit 56 according to the instruction from the image recording control unit 17. The image compressing unit 56 performs a compressing processing to the image signal according to the instruction of the image recording control unit 17. The data size of the image signal becomes smaller than that of the original data, by this compressing processing. For example, as a compressing technology thereof, JPEG (Joint Photographic Experts Group) and the like is used.

The image signal that is compressed is sent from the image compressing unit 56 to the image recording unit 18 and the liquid crystal display monitor 16 that is used for displaying an image. Meanwhile, the body microcomputer 12 sends a control signal to the image recording control unit 17 and the image display control unit 15. The image recording control unit 17 controls the image recording unit 18 based on the control signal from the body microcomputer 12. The image display control unit 15 controls the liquid crystal display monitor 16 that is used for displaying an image based on the control signal from the body microcomputer 12.

The image recording unit 18 records the image signal in an internal memory and/or a removable memory, based on the instruction of the image recording control unit 17. The image recording unit 18 records the information that needs to be stored with the image signal to the interior memory and/or the removable memory, based on the instruction of the image recording control unit 17. The information that needs to be stored with the image signal includes the date and hour of the time the image is photographed, the focal length information, shutter speed information, aperture value information, and photographing mode information.

The liquid crystal display monitor 16 for displaying an image displays the image signal as a visible image, based on the instruction of the image display control unit 15. The liquid crystal display monitor 16 for displaying an image displays the information that needs to be displayed with the image signal, based on the instruction of the image display control unit 15. The information that needs to be displayed with the image signal includes the displaying of the focal length information, shutter speed information, aperture value information, photographing mode information, and the focus state information.

In addition, the liquid crystal display monitor 16 for displaying an image displays a setting screen that needs to be set by a user and the like, in a predetermined photographing/reproducing mode, based on the instruction of the image display control unit 15.

If a user and the like is going to take a picture, the power button 70 is turned ON, and the photographing/reproducing mode switching lever 71 is adjusted to the photographing mode. By doing so, the power of the body of the camera system 100 is turned on, and on the liquid crystal display monitor 16 for displaying an image, the subject that is converted into an electrical image signal by the imaging sensor 11 is displayed as a visible image, based on the instruction of the image display control unit 15.

In the state that the camera system 100 is in the photographing mode, if a user and the like presses the MENU button 72, the liquid crystal display monitor 16 for displaying an image displays items with settings that can be changed by the user and the like in the photographing mode based on the instruction of the image display control unit 15, as a setting menu image that has been iconized.

(1.8: Control System of the Interchangeable Lens Unit)

Figure 11:
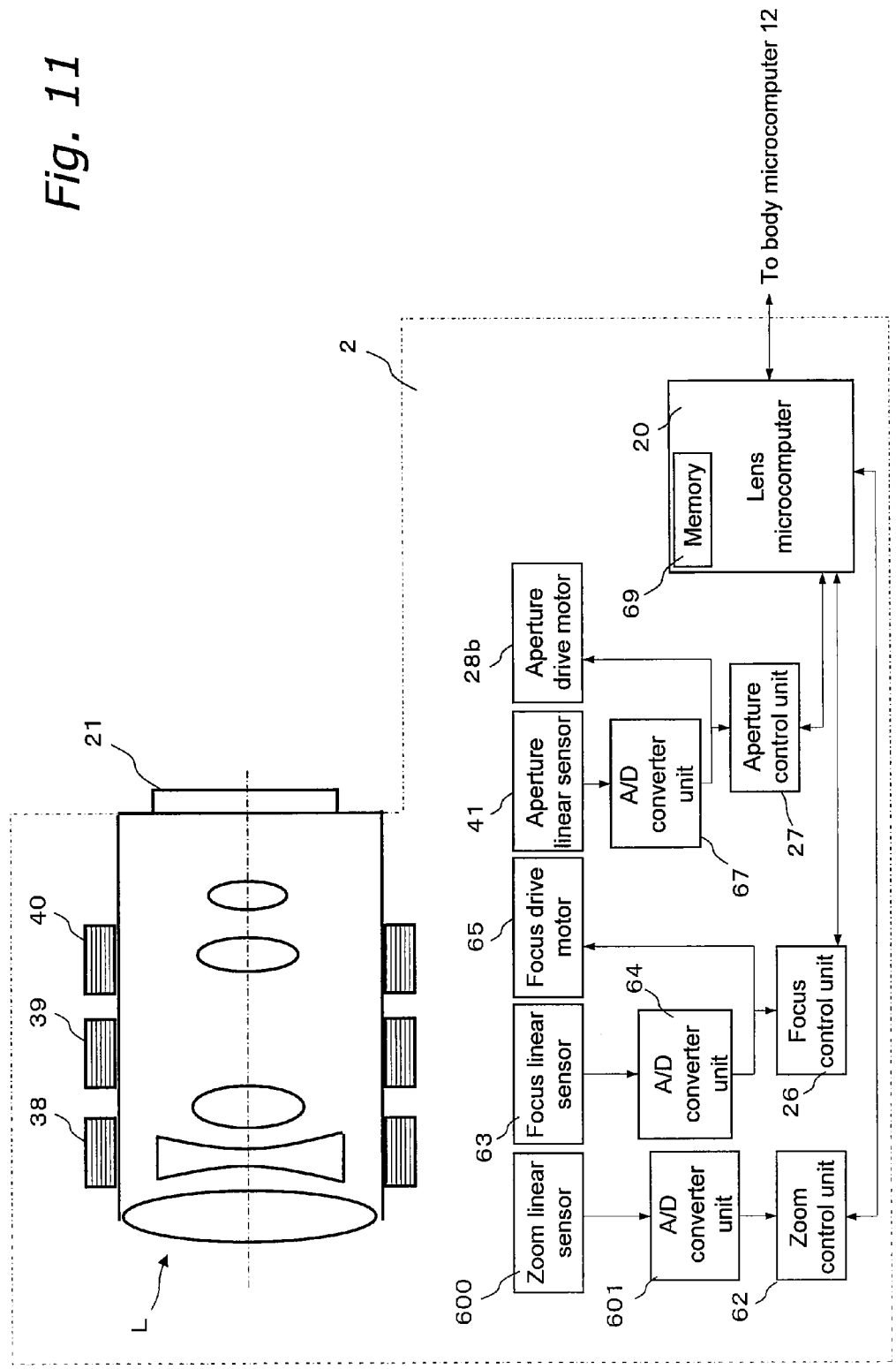
FIG. 11 is a block diagram that shows the control system in the interior of the interchangeable lens unit according to the first embodiment of the present invention.

FIG. 11 is a block diagram that shows the control system in the interchangeable lens unit 2 according to the first embodiment of the present invention.

The lens microcomputer 20 is able to perform two-way communication between the lens microcomputer 20 and the zoom control unit 62, two-way communication between the lens microcomputer 20 and the focus control unit 26, and two-way communication between the lens microcomputer 20 and the aperture control unit 27.

The zoom control unit 62 is able to receive a signal from a zoom linear sensor 600 via an A/D converter unit 601. The zoom control unit 62 converts the rotation amount of the zoom ring 38 that is detected by the zoom linear sensor 600 into focal length information of the imaging optical system L. The zoom control unit 62 sends the focal length information to the lens microcomputer 20.

The focus control unit 26 is able to receive a signal from the focus linear sensor 63, and is able to send a signal to the focus drive motor 65 via the A/D converter unit 64. The focus control unit 26 judges the focus mode by the rotation angle of the focus ring 39 that is detected by the focus linear sensor 63 and digitalized by the A/D converter unit 64. The focus control unit 26 sends the judged result to the lens microcomputer 20. The focus control unit 26 sends to the lens microcomputer 20 an object point distance information that is detected by the rotation angle of the focus ring 39 based on the instruction from the lens microcomputer 20. The focus control unit 26 drives the focus drive motor 65 based on a control signal from the lens microcomputer 20.

The aperture control unit 27 is able to receive a signal from the aperture linear sensor 41, and is able to send a signal to the aperture drive motor 28*b* via the A/D converter unit 67. The aperture control unit 27 judges the aperture mode by the rotation angle of the aperture ring 40 that is detected by the aperture linear sensor 41 and digitalized by the A/D converter unit 67. The aperture control unit 27 sends the judged result to the lens microcomputer 20. The aperture control unit 27 sends to the lens microcomputer 20 the aperture value information that is detected by the rotation angle of the aperture ring 40 based on the instruction from the lens microcomputer 20. The aperture control unit 27 drives the aperture drive motor 28*b* based on a control signal from the lens microcomputer 20.

<2: Operation of the Camera System>

(2.1: Photographing Operation (Viewfinder Photographing Mode) of the Camera System 100)

Next, the photographing operation of the camera system 100 will be described. First, the drive sequence in the viewfinder photographing mode in which a user and the like peeps at the viewfinder eyepiece window 9 to take a picture will be described based on FIGS. 1, 2, 10, and 11.

Power is supplied to the body microcomputer 12 and various units inside the camera system 100, with the operation of a user and the like pressing the release button 30 half way down. The body microcomputer 12 inside the camera system 100 that actuates by the power supply receives various lens data via the lens mount 21 and the body mount 23 from the lens microcomputer 20 in the interchangeable lens unit 2 that also actuates with the power supply, and stores them in the built-in memory 68. Next, the body microcomputer 12 obtains a defocus amount (hereinafter referred to as "Df amount") from the focus detection unit 5, and instructs the lens microcomputer 20 to drive the focus lens group 25 by this Df amount. The lens microcomputer 20 controls the focus control unit 26 and operates the focus lens group 25 by only the Df amount. The Df amount becomes smaller with the repeating of the focus detection and the drive of the focus lens group 25 in this way, and when it becomes equal to or below a predetermined amount, the body microcomputer 12 judges that a focused state is achieved, and the drive of the focus lens group 25 is stopped.

Then, if a user presses the release button 30 all the way down, the body microcomputer 12 instructs the lens microcomputer 20 to make the aperture value be the aperture value that is calculated based on the output from a photometric sensor that is not shown in the figure. Then, the lens microcomputer 20 controls the aperture control unit 27, and stops down the aperture until it becomes the aperture value that is indicated. Simultaneously with the instruction of the aperture value, the body microcomputer 12 retracts the quick return mirror 4 from the optical path X via the quick return mirror control unit 60. After the retracting of the quick return mirror 4 is completed, the imaging sensor control unit 13 instructs for the imaging sensor 11 to be driven and instructs for the shutter unit 10 to be operated. In addition, the imaging sensor control unit 13 exposes the imaging sensor 11 only for a time decided by the shutter speed that is calculated based on the output from the photometric sensor that is not shown in the figure.

After exposure is completed, the image data read out from the imaging sensor 11 by the imaging sensor control unit 13 is displayed as the photographed image on the liquid crystal display monitor 16 for displaying an image, after a predetermined image process is executed. In addition, the image data read out from the imaging sensor 11 and in which a predetermined image process is executed is written as an image data to a memory media via the image reading recording unit 18. In addition, after exposure ends, the quick return mirror 4 and the shutter unit 10 are reset to their initial positions. The body microcomputer 12 instructs the lens microcomputer 20 to reset the aperture to the open position, and the lens microcomputer 20 performs reset commands to each of the units. After reset is completed, the lens microcomputer 20 communicates to the body microcomputer 12 that reset has been completed. The body microcomputer 12 waits for the reset complete information from the lens microcomputer 20 and the completion of a series of processes after exposure, and then, confirms that the state of the release button 30 is in the state of not being pressed, and ends the photographing sequence.

(2.2: Operation of the Monitor Photographing Mode)

Next, the drive sequence in the monitor photographing mode in which a user and the like uses the liquid crystal display monitor 16 for displaying an image to take a picture will be described based on FIGS. 1, 3, 10, and 11.

In the case of using the liquid crystal display monitor 16 for displaying an image for taking a picture, the user operates the photographing mode switching button 75, and sets it to the monitor photographing mode. When the monitor photographing mode is set, the body microcomputer 12 retracts the quick return mirror 4 from the optical path X. By doing so, it is possible for the imaging sensor 11 to obtain and output an image data that is converted from the light from the subject with the image thereof formed on the imaging sensor 11, since the light from the subject reaches the imaging sensor 11. The image data read out from the imaging sensor 11 by the imaging sensor control unit 13 is displayed as the photographed image on the liquid crystal display monitor 16 for displaying an image, after a predetermined image process is executed. In this way, by displaying the photographed image on the liquid crystal display monitor 16 for displaying an image, a user and the like is able to follow a subject without peeping at the viewfinder eyepiece window 9.

Next, with the operation of a user and the like pressing the release button 30 half way down, the body microcomputer 12 of the camera system 100 receives various lens data via the lens mount 21 and the body mount 23 from the lens microcomputer 20 in the interchangeable lens unit 2, and stores them in the built-in memory 68. Next, the body microcomputer 12 returns the quick return mirror 4 to a predetermined position on the optical path X via the quick return mirror control unit 60, and obtains a Df amount from the focus detection unit 5 and instructs the lens microcomputer 20 to drive the focus lens group 25 by this Df amount. The lens microcomputer 20 controls the focus control unit 26 and operates the focus lens group 25 by only the Df amount. The Df amount becomes smaller with the repeating of the focus detection and the drive of the focus lens group 25 in this way, and when it becomes equal to or below a predetermined amount, the body microcomputer 12 judges that a focused state is achieved, and the drive of the focus lens group 25 is stopped.

Then, if a user presses the release button 30 all the way down, the body microcomputer 12 instructs the lens microcomputer 20 to make the aperture value be the aperture value that is calculated based on the output from a photometric sensor that is not shown in the figure. Then, the lens microcomputer 20 controls the aperture control unit 27, and stops down the aperture until it becomes the aperture value that is indicated. Simultaneously with the instruction of the aperture value, the body microcomputer 12 retracts the quick return mirror 4 from the optical path X via the quick return mirror control unit 60. After the retracting of the quick return mirror 4 is completed, the imaging sensor control unit 13 instructs for the imaging sensor 11 to be driven and instructs for the shutter unit 10 to be operated. In addition, the imaging sensor control unit 13 exposes the imaging sensor 11 only for a time decided by the shutter speed that is calculated based on the output from the photometric sensor that is not shown in the figure.

After exposure is completed, the image data read out from the imaging sensor 11 by the imaging sensor control unit 13 is displayed as the photographed image on the liquid crystal display monitor 16 for displaying an image, after a predetermined image process is executed. In addition, the image data read out from the imaging sensor 11 and in which a predetermined image process is executed is written as an image data to a memory media via the image reading recording unit 18. In addition, after exposure ends, since the quick return mirror 4 is positioned in the state of being retracted from the optical path X, the user is able to continue to look at the subject as the image to be photographed on the liquid crystal display monitor 16 for displaying an image, through the monitor photographing mode.

In addition, in the case of canceling the monitor photographing mode, the user operates the photographing mode switching button 75, and changes the mode to the normal photographing mode, or the viewfinder photographing mode in which a picture is taken peeping at the viewfinder eyepiece window 9. When the mode is changed to the viewfinder photographing mode, the quick return mirror 4 is returned to a predetermined position on the optical path X. In addition, even at the time of turning off the power of the body of the camera system 100 (for example, a single-lens reflex digital camera), the quick return mirror 4 is returned to a predetermined position on the optical path X.

(2.3: Exposure Setting Operation of the Camera System)

Next, the exposure setting operation of the camera system 100 will be described using FIGS. 4 and 10. The camera system 100 has four exposure setting modes which are a program photographing mode in which exposure setting is performed automatically with respect to a normal photographing region, a shutter speed priority photographing mode in which the shutter speed is set manually, an aperture priority photographing mode in which the aperture value is set manually, and a manual photographing mode in which both the shutter speed and the aperture value are set manually.

A user and the like who operates the camera system 100 is able to select the four exposure setting modes by setting in combination the aperture ring 40 to a predetermined rotation angle and the rotation angle of the shutter speed setting dial 31. In other words, a user and the like is able to set the mode to the program photographing mode by aligning the shutter speed setting dial 31 to the automatic position, in the state that the character "A" on the aperture ring 40 is matched with the index 33. A user and the like is able to set the mode to the shutter speed priority photographing mode by aligning the shutter speed setting dial 31 to a position in which manual setting is possible, in the state that the character "A" on the aperture ring 40 is matched with the index 33. A user and the like is able to set the mode to the aperture priority photographing mode by aligning the shutter speed setting dial 31 to the automatic position, in the state that the one of any of the characters "2" to "11" on the aperture ring 40 is matched with the index 33. A user and the like is able to set the mode to the manual photographing mode by aligning the shutter speed setting dial 31 to the position in which manual setting is possible, in the state that one of any of the characters "2" to "11" on the aperture ring 40 is matched with the index 33.

Below, in the four exposure setting modes, the program photographing mode and the shutter speed priority photographing mode are referred to collectively as automatic aperture mode. In addition, below, the aperture priority photographing mode and the manual photographing mode are referred to collectively as manual aperture mode.

(2.4: Exposure Setting Operation of the Automatic Aperture Mode)

The aperture linear sensor 41 outputs to the aperture control unit 27 a signal in accordance with the rotation angle. When it is in the state that the character "A" on the aperture ring 40 is matched with the index 33, if the user operates the release button 30, the aperture control unit 27 judges that the exposure setting mode is in the automatic aperture mode, based on a signal received from the aperture linear sensor 41. The judged result is sent to the lens microcomputer 20 and the body microcomputer 12 (the transmission to the body microcomputer 12 is performed via the inter-microcomputer communication between the lens microcomputer 20 and the body microcomputer 12).

In addition, the shutter speed setting dial 31 outputs to the body microcomputer 12 a signal in accordance with the rotation angle. The body microcomputer 12 recognizes that the exposure setting mode is in the automatic aperture mode based on the judged result received from the aperture control unit 27 and the signal from the shutter speed setting dial 31.

The body microcomputer 12 sends an instruction to the digital signal processing unit 53. The digital signal processing unit 53 sends an image signal to the body microcomputer 12 at a predetermined timing based on the received instruction. The body microcomputer 12 calculates an exposure value based on the image signal that is received. The body microcomputer 12 calculates a proper combination from the adjustable aperture value and the shutter speed, if the exposure setting mode is the program photographing mode. The body microcomputer 12 calculates a proper aperture value for the shutter speed that is set, if the exposure setting mode is the shutter speed priority photographing mode.

The body microcomputer 12 generates a control signal based on the calculated result. The body microcomputer 12 sends the control signal that is based on the aperture value that is calculated to the aperture control unit 27 via the lens microcomputer 20 on the side of the interchangeable lens unit 2. The body microcomputer 12 sends the control signal that is based on the shutter speed that is calculated to the shutter control unit 14, if the exposure setting mode is the program photographing mode. The body microcomputer 12 sends information on the shutter speed that is set by the shutter speed setting dial 31 to the shutter control unit 14, if the exposure setting mode is the shutter speed priority photographing mode.

In addition, the body microcomputer 12 sends a control signal to the image display control unit 15. The image display control unit 15 drives the liquid crystal display monitor 16 for displaying an image. The liquid crystal display monitor 16 for displaying an image displays that the exposure setting mode is the program photographing mode when the content of the control signal indicates the program photographing mode. The liquid crystal display monitor 16 for displaying an image displays that the exposure setting mode is the shutter speed priority photographing mode when the content of the control signal indicates the shutter speed priority photographing mode.

The aperture control unit 27 generates a drive signal for driving the aperture drive motor 28*b* based on the control signal from the lens microcomputer 20. The aperture drive motor 28*b* is driven based on the drive signal. The aperture blade is driven by the driving of the aperture drive motor 28*b*.

The shutter control unit 14 generates a drive signal for driving the shutter drive motor 10*a* based on the control signal from the body microcomputer 12. The shutter drive motor 10*a* is driven based on the drive signal. The shutter unit 10 is driven by the driving of the shutter drive motor 10*a*.

The exposure setting by the automatic aperture mode of the camera system 100 is performed as described above. The operation above is executed instantly after a user and the like operates the release button 30.

The body microcomputer 12 sends a control signal to the image recording control unit 17 when photographing ends. The image recording unit 18 records an image signal based on the instruction of the image recording control unit 17 in an internal memory and/or a removable memory.

The image recording unit 18 records the information that the exposure setting mode is the program photographing mode with the image signal in an internal memory and/or a removable memory, when the content of the control signal indicates the program photographing mode, based on the instruction of the image recording control unit 17. The image recording unit 18 records the information that the exposure setting mode is the shutter speed priority photographing mode with the image signal in the internal memory and/or the removable memory, when the content of the control signal indicates the shutter speed priority photographing mode, based on the instruction of the image recording control unit 17.

(2.5: Exposure Setting Operation of the Manual Aperture Mode)

Next, when in the state that the position of one of any of the characters "2" to "11" on the aperture ring 40 is matched with the index 33, the aperture control unit 27 judges that the exposure setting mode is the manual aperture mode based on a signal received from the aperture linear sensor 41, when a user operates the release button 30. The judged result is sent to the lens microcomputer 20. In addition, the shutter speed setting dial 31 outputs a signal in accordance with the rotation angle to the body microcomputer 12.

The body microcomputer 12 recognizes that the exposure setting mode is the manual aperture mode based on the judged result received from the aperture control unit 27 and the signal from the shutter speed setting dial 31.

The lens microcomputer 20 requests for the aperture value information that is detected by the rotation angle of the aperture ring 40 from the aperture control unit 27. The aperture control unit 27 sends the aperture value information that is detected by the rotation angle of the aperture ring 40 based on the instruction from the lens microcomputer 20 to the lens microcomputer 20 and the body microcomputer 12 (the transmission to the body microcomputer 12 is performed via the inter-microcomputer communication between the lens microcomputer 20 and the body microcomputer 12). The body microcomputer 12 sends an instruction to the digital signal processing unit 53, if the exposure setting mode is the aperture priority photographing mode. The digital signal processing unit 53 sends an image signal at a predetermined timing to the body microcomputer 12 based on the instruction received.

The body microcomputer 12 calculates the shutter speed based on the image signal received, if the exposure setting mode is the aperture priority photographing mode. The body microcomputer 12 calculates a proper shutter speed for the aperture value that is detected, if the exposure setting mode is the aperture priority photographing mode. The body microcomputer 12 generates a control signal based on the calculated result, if the exposure setting mode is the aperture priority photographing mode. The body microcomputer 12 sends the control signal based on the shutter speed that is calculated to the shutter control unit 14, if the exposure setting mode is the aperture priority photographing mode. The body microcomputer 12 sends the information on the shutter speed that is set by the shutter speed setting dial 31 to the shutter control unit 14, if the exposure setting mode is the manual photographing mode.

In addition, the body microcomputer 12 sends a control signal to the image display control unit 15. The image display control unit 15 drives the liquid crystal display monitor 16 for displaying an image. The liquid crystal display monitor 16 for displaying an image displays that the exposure setting mode is the aperture priority photographing mode when the content of the control signal indicates the aperture priority photographing mode. The liquid crystal display monitor 16 for displaying an image displays that the exposure setting mode is the manual photographing mode when the content of the control signal indicates the manual photographing mode.

The aperture control unit 27 generates a drive signal for driving the aperture drive motor 28*b* based on the control signal from the lens microcomputer 20. The aperture drive motor 28*b* is driven based on the drive signal. The aperture blade is driven by the driving of the aperture drive motor 28*b*. The shutter control unit 14 generates a drive signal for driving the shutter drive motor 10*a* based on the control signal from the body microcomputer 12. The shutter drive motor 10*a* is driven based on the drive signal. The shutter unit 10 is driven by the driving of the shutter drive motor 10*a*.

The exposure setting by the manual aperture mode of the camera system 100 is performed as described above. The operation above is executed instantly after a user and the like operates the release button 30.

The body microcomputer 12 sends a control signal to the image recording control unit 17 when photographing ends. The image recording unit 18 records the image signal in an internal memory and/or a removable memory, based on the instruction of the image recording control unit 17.

The image recording unit 18 records information that the exposure setting mode is the aperture priority mode with the image signal in the internal memory and/or the removable memory, when the content of the control signal indicates the aperture priority mode, based on the instruction of the image recording control unit 17. The image recording unit 18 records the information that the exposure setting mode is the manual photographing mode with the image signal in the internal memory and/or the removable memory when the content of the control signal indicates the manual photographing mode, based on the instruction of the image recording control unit 17.

(2.6: Operation of the Depth-of-Field Preview Mode)

Next, the depth-of-field preview mode according to the first embodiment of the present invention will be described.

The checking of the depth of field in the camera system 100 is performed by looking at the liquid crystal display monitor 16 for displaying an image. At this time, on the liquid crystal display monitor 16 for displaying an image, the image in which the aperture unit 28 has the aperture value during the time of actually photographing (hereinafter referred to as the "actual aperture live view image") is displayed. In order to display this actual aperture live view image on the liquid crystal display monitor 16 for displaying an image, when the depth-of-field preview mode button 76 is pressed, as shown in FIG. 3, the photographing mode is changed to the monitor photographing mode automatically. By changing into the monitor photographing mode this way, it is possible to display the actual aperture live view image with the aperture value at the time of actually photographing on the liquid crystal display monitor 16 for displaying an image, and it is possible to easily check the depth of field.

In this depth-of-field preview mode, the lens microcomputer 20 requests for the information on the aperture value that is detected by the rotation angle of the aperture ring 40 from the aperture control unit 27. The aperture control unit 27 sends the information on the aperture value that is detected by the rotation angle of the aperture ring 40 based on the instruction from the lens microcomputer 20 to the lens microcomputer 20 and the body microcomputer 12 (the transmission to the body microcomputer 12 is performed via the inter-microcomputer communication between the lens microcomputer 20 and the body microcomputer 12). The aperture control unit 27 generates a drive signal for driving the aperture drive motor 28*b* based on a control signal from the lens microcomputer 20. The aperture drive motor 28*b* is driven based on the drive signal. The aperture blade is driven by the driving of the aperture drive motor 28*b*.

(2.7: Specific Operation 1 of the Depth-of-Field Preview Mode)

Next, a specific operation in the depth-of-field preview mode (hereinafter referred to as "specific operation 1") will be described using the flowchart shown in FIG. 12.

Figure 13:
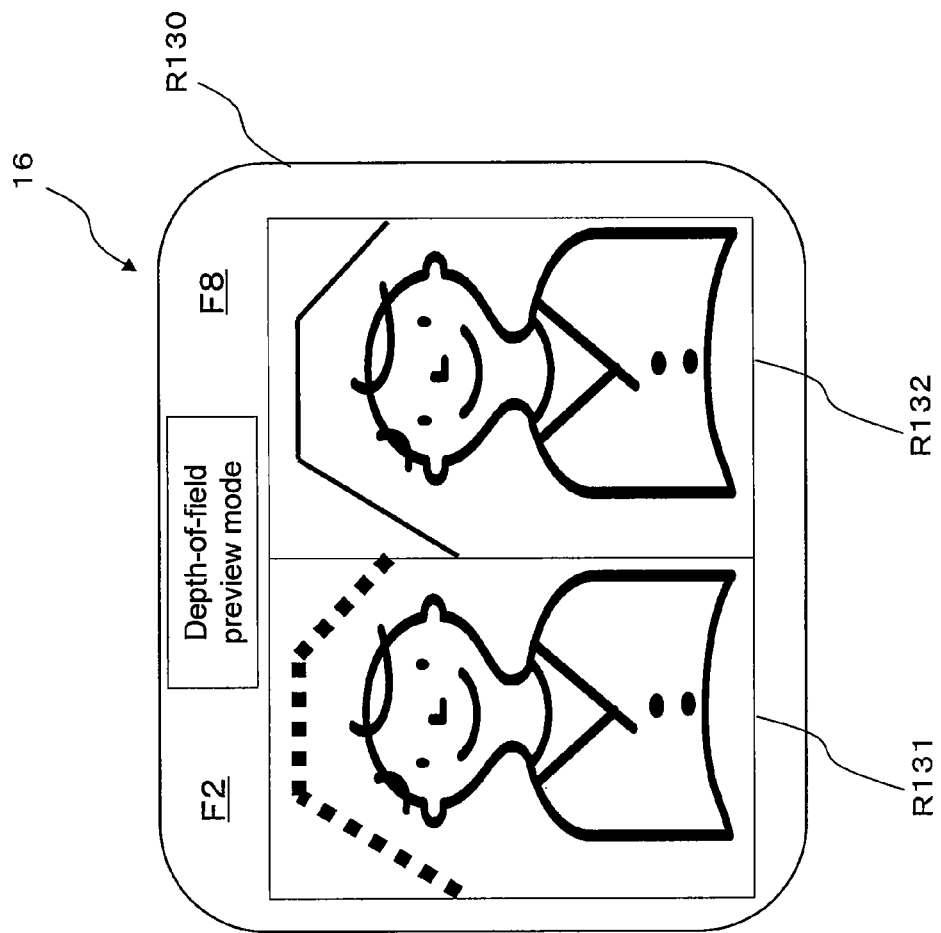
FIG. 13 is a figure that shows actual aperture live view images on a liquid crystal display monitor that is for displaying an image, according to the first embodiment of the present invention.

The body microcomputer 12 of the camera system 100 judges whether or not the depth-of-field preview mode button 76 is pressed (Step S1). If the depth-of-field preview mode button 76 is pressed, the mode is changed to the depth-of-field preview mode, and as shown in FIG. 3, the quick return mirror control unit 60 retracts the quick return mirror 4 from the optical path X, and the operation of the imaging sensor 11 is started (Step S2). Next, the live view image obtained by the imaging sensor 11 is displayed on the liquid crystal display monitor 16 for displaying an image by the image display control unit 15 (Step S3). At this time, for example, as shown in FIG. 13, on the display region R131 on the left side of the display region of the liquid crystal display monitor 16 for displaying an image in which the display region thereof is divided into left and right regions, an image in which the aperture value is F2, which is an aperture value that is the brightest (aperture value at the time that the aperture is opened) and the depth of field is the shallowest in this interchangeable lens unit 2, is shown. For example, in the case of an image in which an image of a person is captured in the center, an image with a background that is out of focus of the image of the person that is captured in the center is shown on the display region R131 on the left side of the display region of the liquid crystal display monitor 16 for displaying an image. In addition, the image on the left side region of this liquid crystal display monitor 16 for displaying an image is stored temporarily by the buffer memory 54 and kept in a state of being displayed on the liquid crystal display monitor 16 for displaying an image. Next, when a user and the like operates the aperture ring 40 and a predetermined aperture value is matched (Step S4), the aperture control unit 27 detects an aperture information detected by the rotation angle of the aperture ring 40 based on the instruction from the lens microcomputer 20 (Step S5). Then, the aperture control unit 27 generates a drive signal for driving the aperture drive motor 28b based on the control signal from the lens microcomputer 20, and the aperture blade is driven by the driving of the aperture drive motor 28b, and the aperture value is changed into the predetermined aperture value (Step S6). At this time, as shown in FIG. 13, on the display region R132 on the right side of the display region of the liquid crystal display monitor 16 for displaying an image, an image with an aperture value of, for example, F8, set at the aperture ring 40, is simultaneously displayed (Step S7) with the image with the aperture value of F2 that is displayed in Step S3 on the display region R131 on the left side of the display region of the liquid crystal display monitor 16 for displaying an image. This image that is displayed on the display region R132 on the right side is an image in which the aperture value is F8, and therefore, compared to the image displayed on the display region R131 on the left side, it is an image in which both the person in the center and the background are in focus and the depth of field is deep. In this way, in the camera system 100, since it is possible to simultaneously display two images with different depth of field side by side on the display region of the liquid crystal display monitor 16 for displaying an image, a user is able to check ahead of time on which image of the depth of field thereof to take when photographing. At this time, as shown in FIG. 13, two actual aperture values are displayed on the upper left and upper right portions on the display region of the liquid crystal display monitor 16 for displaying an image, and in accordance with a change in the aperture value, the image that is displayed on the right side region is the live view display of the image corresponding to this aperture value. In addition, the depths of field set are not limited to the aperture values F2 and F8, respectively. And, after it is confirmed that the release button 30 is not being operated (Step S8) (progress to an action mode to be described later, in the case that the release button 30 is operated), whether or not the depth-of-field preview mode button 76 is canceled is judged (Step S9). In the case that the depth-of-field preview mode button 76 is canceled, the depth-of-field preview mode is ended, and as shown in FIG. 2, the quick return mirror 4 is returned to a predetermined position on the optical path X (Step S10).

As described above, according to the camera system 100 of this first embodiment, if the mode is set in the depth-of-field preview mode, the quick return mirror 4 is retracted from the optical path, and the photographing mode is automatically changed into the monitor photographing mode in which the liquid crystal display monitor 16 for displaying an image is used. Therefore, two images with aperture values at the time when actually photographing, in other words, two actual aperture live view images, can be displayed concurrently, simultaneously on the liquid crystal display monitor 16 for displaying an image. Therefore, it is possible to compare images with different depths of field, and it is possible for the user to easily judge which aperture value will be most proper for taking a picture. In addition, the aperture values of the images that are displayed concurrently, simultaneously on the liquid crystal display monitor 16 for displaying an image are normally set to be different, but of course, two images with the same aperture value may also be concurrently displayed simultaneously.

(2.8: Specific Operation 2 of the Depth-of-Field Preview Mode)

Figure 14:
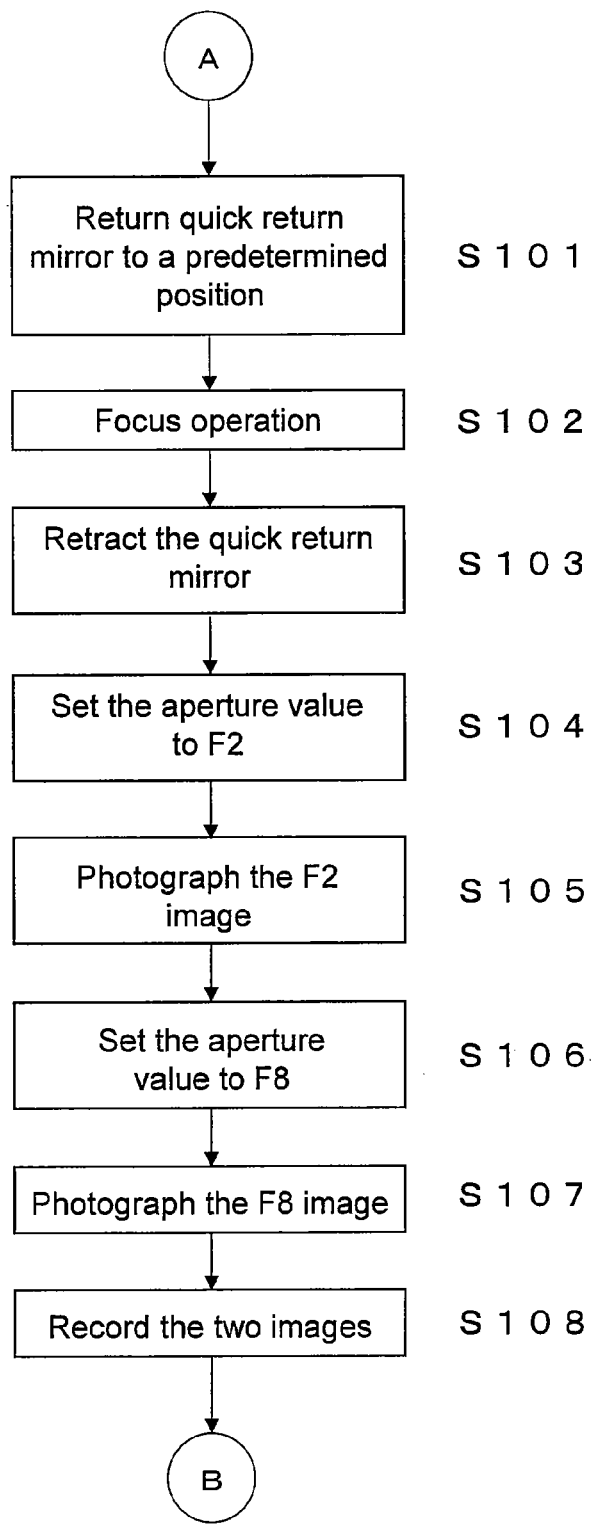
FIG. 14 is a flowchart for describing an action mode in the depth-of-field preview mode according to a second embodiment of the present invention.

Next, different from the specific operation 1 in the depth-of-field preview mode described above, a specific operation (hereinafter, "specific operation 2") in the depth-of-field preview mode will be described using the flowchart shown in FIGS. 12 and 14. In addition, descriptions on parts of the specific operation 2 that are the same as the specific operation 1 will be omitted.

Figure 12:
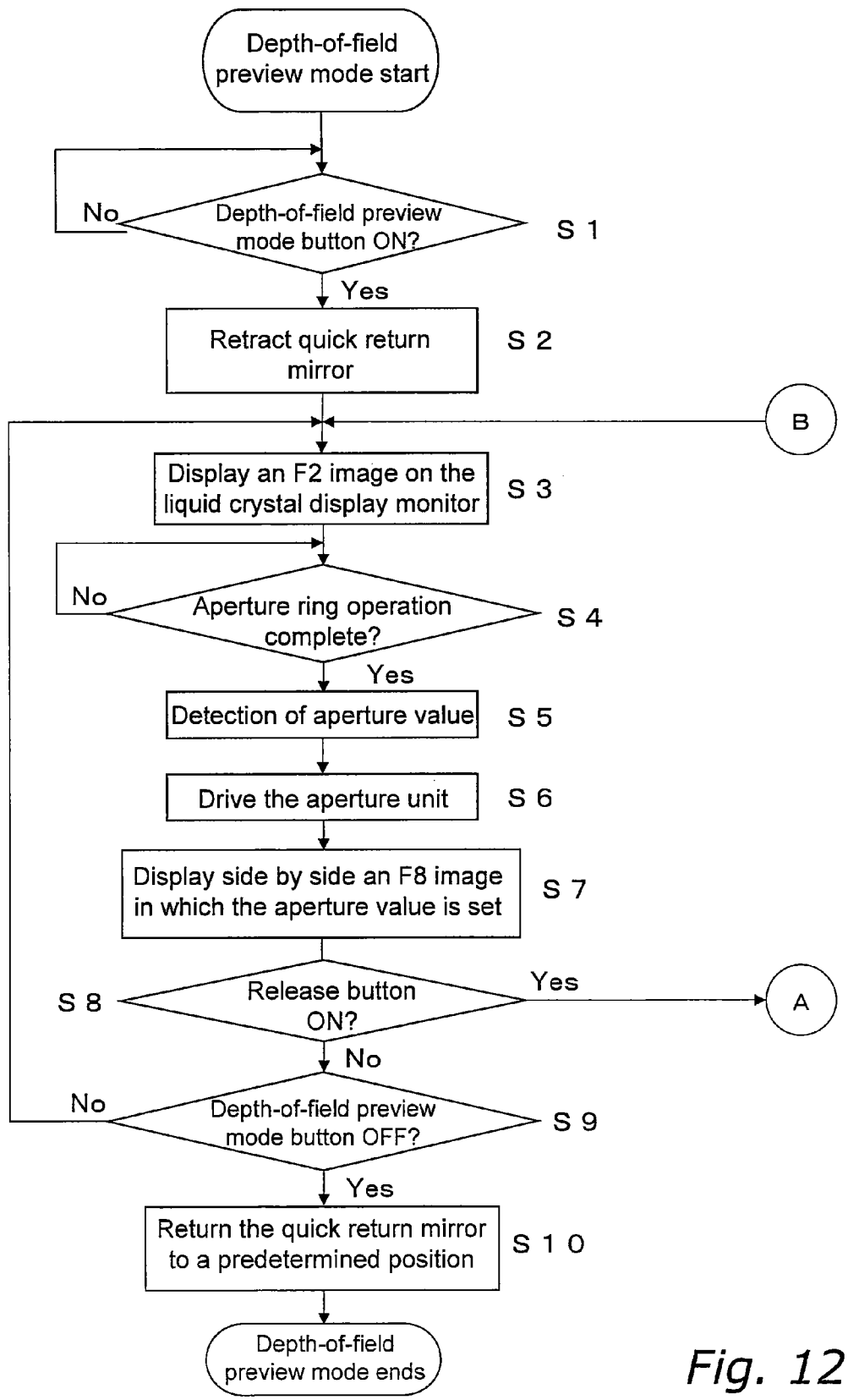
FIG. 12 is a flowchart for describing a depth-of-field preview mode according to the first embodiment of the present invention.

In the flowchart shown in FIG. 12, after Step S7 is ended, in the state in which the two left and right images shown in FIG. 13 are displayed on the liquid crystal display monitor 16 for displaying an image, whether or not the release button 30 is operated is judged (Step S8), and in the case that a user has operated the release button, it is changed to an action mode. Then, the quick return mirror 4 is returned to a predetermined position on the optical path X (Step S101), and a focus operation is executed (Step S102). Next, the quick return mirror 4 is retracted from the optical path X (Step S103), and the aperture value is set to F2 initially (Step S104). The aperture blade is driven so that the aperture value becomes F2, and an image with the aperture value of F2 is taken (Step S105). Subsequently, the aperture value is set to F8 (Step S106). The aperture blade is driven so that the aperture value becomes F8, and the image with the aperture value of F8 is taken (Step S107). By doing so, two images with different depths of field are obtained by continuous shooting. The two photographed images obtained by continuous shooting are recorded in an internal memory and/or a removable memory as image signal data based on an instruction of the image recording control unit 17 (Step S108). Then, when this action mode ends, the mode returns to the depth-of-field preview mode once again (corresponding to the part B on FIGS. 12 and 14), moving in between (Step S2) and (Step S3) in the flowchart in FIG. 12.

As described above, according to the camera system 100, in the depth-of-field preview mode, automatically, the quick return mirror is retracted from the optical path and the photographing mode is changed to the monitor photographing mode in which the liquid crystal display monitor 16 for displaying an image is used, and by doing so, two different images with aperture values at the time when actually photographing, in other words, since it is possible to take a picture at the same time (with one photographing operation) while looking at a real aperture live view image, it is possible to continuously shoot images with different depths of field. Therefore, since it is possible to simplify the setting of photographing conditions and the like, it is possible to expand the range of photographing of a user and the like.

Other Embodiments

Figure 15:
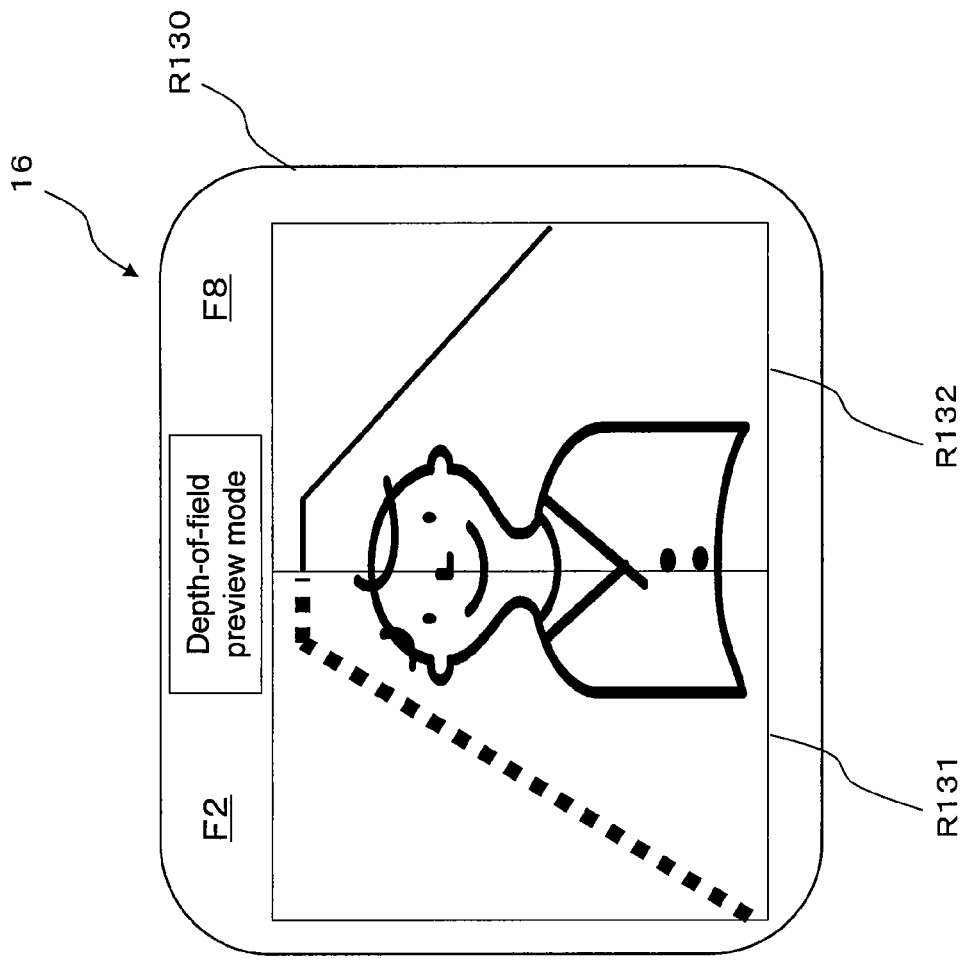
FIG. 15 is a figure that shows an actual aperture live view image on the liquid crystal display monitor that is for displaying an image according to another embodiment of the present invention.

In the above described embodiment, two images with different depths of field are displayed side by side on the liquid crystal display monitor 16 for displaying an image. However, the displaying style thereof is not limited to this. The style may be, for example, as shown in FIG. 15, in the display region R130 on the liquid crystal display monitor 16 for displaying an image, one image is divided into two left and right portions on the center of the image of a person. On the display region R131 on the left side, the image with an aperture value of F2 that is stored temporarily is displayed, and on the display region R132 on the right side, in accordance with a change of the aperture value of the camera system 100, an image corresponding to this aperture value is live view displayed.

In addition, in the above described embodiment, the change in the aperture value is performed using the aperture ring that is equipped in the interchangeable lens unit 2. However, it may be operated by using the dial and the like that is equipped in the camera body 1. In addition, the dial that is equipped in the camera body 1 does not have to be a dial that is solely used for changing the aperture value, and it may consist other functions.

In addition, in the above described embodiment, the image that displays on the liquid crystal display monitor 16 for displaying an image is done using the imaging sensor 11. However, the style may be to arrange a separate second imaging sensor in the viewfinder optical system, and to have the image thereof displayed on the liquid crystal display monitor 16 for displaying an image. In that case, it is not necessary to retract the quick return mirror 4 from the optical path X. In addition, the configuration or the arrangement of the quick return mirror 4 and the viewfinder optical system 19 are not limited to the configuration, arrangement, and the like in the embodiment described above.

In addition, in the above described embodiment, the style used is such that the mode is changed to the depth-of-field preview mode if the depth-of-field preview mode button is pressed once, and canceled if it is pressed again. However, the configuration may be to have the depth-of-field preview mode continue only during the time that the depth-of-field preview mode button is being pressed.

In addition, in the above described embodiment, the focus detection unit 5 is used in the focus detection operation. However, it may be an AF detection system in which the imaging sensor 11 is used. In this case, the process of Step S101 in FIG. 14 is not necessary.

In addition, in the above described embodiment, the case in which images corresponding to two aperture values are displayed on the liquid crystal display monitor 16 for displaying an image is described. However, it is not limited to this, for example, images corresponding to a plurality of three or more aperture values may be displayed in multi-windows on the liquid crystal display monitor for displaying an image. At this time, the image corresponding to the aperture value in the case that the aperture is in the open state may be displayed constantly on a specific display region on the liquid crystal display monitor 16 for displaying an image, and a plurality of images that correspond to aperture values other than the aperture value in the case that the aperture is in the open state may be displayed on other display regions, respectively.

In addition, in the above described embodiment, the operation of the camera system 100 when photographing is described. However, for example, the photographed image may be reproduced in the camera system 100, in the so-called reproducing mode, and images taken with different aperture values may be displayed side by side, left and right, on the display region R130 on the liquid crystal display monitor 16 for displaying an image. By doing so, since a user (user of the camera system 100) will be able to know the relationship between an aperture value and an image to be photographed by feeling, the user will be able to refer to the aperture values next time when taking a picture.

In addition, in the above described embodiment, a single-lens reflex camera is described. However, the invention is not limited to this, for example, the invention may be applied in a compact camera. It is particularly favorable to apply the invention in a compact camera that includes a large size image pickup device.

In addition, the coordinate axes, directions, and the like used in the description above are not for limiting the state of use of the present invention.

In addition, the specific configuration of the present invention is not limited to the above described embodiment, and various modifications and corrections are possible within the range not deviating from the substance of the invention.

First Additional Statement

The present invention can also be expressed in the following way.
<Content of the First Additional Statement>
(Additional Statement 1)

An imaging device including an observing optical system, having a movable reflecting mirror arranged between an imaging optical system and an image pickup device, that observes a light that is reflected by said reflecting mirror, the imaging device comprising:

a reflecting mirror driving unit that drives said reflecting mirror;

a first photographing mode that drives said reflecting mirror to a first state so that a light that passed through said imaging optical system is reflected by said reflecting mirror and led to said observing optical system, and performs photographing;

a second photographing mode that drives said reflecting mirror to a second state so that a light that passed through said imaging optical system is led to said image pickup device, and performs photographing;

an image display unit that displays an image;

a preview operation unit in which, by being operated, said photographing optical system is controlled to be in a first aperture state, and a first image data obtained at said image pickup device is displayed on said display unit with the change of mode into said second photographing mode;

an aperture changing unit that changes the aperture value of said optical system; and an image display control unit that displays an image data in a second actual aperture state, that is different from said first actual aperture state by operating said aperture changing unit, on said image display unit simultaneously with an image data of said first aperture state, in a state that said preview operation unit is being operated.
(Additional Statement 2)

The imaging device according to Additional Statement 1, further comprising an image recording unit that records an image taken in said first actual aperture state and an image taken in said second actual aperture state.
<Description on First Additional Statement>

The invention according to the Additional Statement 1 is an imaging device comprising an observing optical system, having a movable reflecting mirror arranged between an imaging optical system and an image pickup device, that observes a light that is reflected by the reflecting mirror, and the imaging device is characterized in comprising a reflecting mirror driving unit that drives the reflecting mirror, a first photographing mode that performs photographing such that the reflecting mirror is driven to a first state so that a light that passed through the imaging optical system is reflected by said reflecting mirror and led to the observing optical system, a second photographing mode that performs photographing such that the reflecting mirror is driven to a second state so that a light that passed through the imaging optical system is led to the image pickup device, an image display unit that displays an image, a preview operation unit in which, by being operated, the photographing optical system is controlled to be in a first aperture state and a first image data obtained at the image pickup device is displayed on said display unit with the change of mode into the second photographing mode, an aperture changing unit that changes the aperture value of the optical system, and an image display control unit that displays an image data in a second actual aperture state, that is different from the first actual aperture state by operating said aperture changing unit, on the image display unit simultaneously with an image data of said first aperture state, in a state that the preview operation unit is being operated.

The invention according to the Additional Statement 2 is an imaging device characterized in comprising an image recording unit that records an image taken in the first actual aperture state and an image taken in the second actual aperture state.

INDUSTRIAL APPLICABILITY

The present invention is a system in which an actual aperture live view image can be displayed using a liquid crystal display monitor for displaying an image, in a single-lens reflex digital camera, and it enhances the user-friendliness of an imaging device.

The invention claimed is:

1. A camera system, comprising:
   an imaging optical system having an aperture, and configured to focus the light from a subject;
   an imaging unit configured to convert the light from said imaging optical system into an electrical signal to obtain an image of the subject;
   an image display unit including a display region having a first display region and a second display region, the image display unit displaying on said display region the image of the subject obtained by said imaging unit;
   an aperture setting unit configured to adjust said aperture and set an aperture value of said imaging optical system;
   a depth-of-field preview mode setting unit in which information for setting the mode to a depth-of-field preview mode is inputted; and
   a memory configured to store an image,
   wherein said image display unit displays a first image on said first display region and a second image on said second display region at a time, the first image being the image of the subject obtained by said imaging unit at a first aperture value of the aperture value set by said aperture setting unit, the second image being the image of the subject obtained by said imaging unit at a second aperture value of the aperture set by said aperture setting unit,
   wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and
   wherein said image display unit includes said display region that further includes a third display region that is associated with said first display region, and a fourth display region that is associated with said second display region,
   said image display unit displays on said third display region said aperture value set for said first image while the first image is displayed on said first display region, and
   said image display unit displays on said fourth display region said aperture value set for said second image while the second image is displayed on said second display region.

2. The camera system according to claim 1, wherein the memory includes an image recording unit that records said first image and said second image.

3. The camera system according to claim 2, wherein said image recording unit records said aperture value at the time said first image is obtained, and records said aperture value at the time said second image is obtained.

4. The camera system according to claim 1, further comprising:
   an observing optical system for observing the light from said imaging optical system;
   a movable mirror arranged between said imaging optical system and said imaging unit, said movable mirror being configured to be either in a first position for leading the light from said imaging optical system to said observing optical system, or in a second position for leading the light from said imaging optical system to said imaging unit; and
   a photographing mode switching unit that switches between a first photographing mode in which an image is taken with the position of said movable mirror being arranged in said first position, and a second photographing mode in which an image is taken with the position of said movable mirror being arranged in said second position;
   wherein, when said information is inputted for setting the mode to said depth-of-field preview mode by said depth-of-field preview mode setting unit, the mode is set in said depth-of-field preview mode by said depth-of-field preview mode setting unit,
   said aperture setting unit adjusts said aperture so that said aperture value of said imaging optical system becomes said first aperture value,
   said photographing mode switching unit switches to said second photographing mode,
   said image display unit displays said first image obtained by said imaging unit on said first display region,
   furthermore, said aperture setting unit adjusts said aperture so that said aperture value of said imaging optical system becomes said second aperture value, and
   said image display unit displays said second image obtained by said imaging unit on said second display region.

5. The camera system according to claim 4, further comprising:
   a camera body including said imaging unit, said observing optical system, said movable mirror, said photographing mode switching unit, the depth-of-field preview mode setting unit, said image display unit, and the image recording unit; and
   an interchangeable lens unit including said imaging optical system and said aperture setting unit.

6. The camera system according to claim 1, wherein said first image is an image obtained by said imaging unit when said aperture is more open than when said second image is obtained.

7. A camera body that is used in a camera system with an interchangeable lens unit that comprises an imaging optical system having an aperture, and configured to focus light from a subject, and an aperture setting unit configured to adjust said aperture and set an aperture value of said imaging optical system, the camera body comprising:

an imaging unit configured to convert the light from said imaging optical system into an electrical signal to obtain an image of the subject;

an observing optical system for observing the light from said imaging optical system;

a movable mirror arranged between said imaging optical system and said imaging unit, said movable mirror being configured to be either in a first position for leading the light from said imaging optical system to said observing optical system, or in a second position for leading the light from said imaging optical system to said imaging unit;

a photographing mode switching unit that switches between a first photographing mode in which an image is taken with the position of said movable mirror being arranged in said first position, and a second photographing mode in which an image is taken with the position of said movable mirror being arranged in said second position;

a depth-of-field preview mode setting unit in which information for setting the mode to a depth-of-field preview mode is inputted;

an image display unit including a display region having a first display region and a second display region, the image display unit displaying on said display region the image of the subject obtained by said imaging unit;

and a memory configured to store an image;

wherein said image display unit displays a first image on said first display region and a second image on said second display region at a ti e the first image being the image of the subject obtained by said imaging unit at a first aperture value of the aperture value set by said aperture setting unit, the second image being the image of the subject obtained by said imaging unit at a second aperture value of the aperture set by said aperture setting unit, wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and wherein said image display unit includes said display region that further includes a third display region that is associated with said first display region, and a fourth display region that is associated with said second display region, said image display unit displays on said third display region said aperture value set for said first image while the first image is displayed on said first display region, and said image display unit displays on said fourth display region said aperture value set for said second image while the second image is displayed on said second display region.

8. An interchangeable lens unit, comprising:

an imaging optical system having an aperture, and configured to focus the light from a subject; and an aperture setting unit configured to adjust said aperture and set an aperture value of said imaging optical system;

wherein, the interchangeable lens unit is used in a camera system with a camera body that comprises an imaging unit configured to convert the light from said imaging optical system into an electrical signal to obtain an image of the subject; an observing optical system for observing the light from said imaging optical system;

a movable mirror arranged between said imaging optical system and said imaging unit, said movable mirror being configured to be either in a first position for leading the light from said imaging optical system to said observing optical system, or in a second position for leading the light from said imaging optical system to said imaging unit; a photographing mode switching unit that switches between a first photographing mode in which an image is taken with the position of said movable mirror being arranged in said first position, and a second photographing mode in which an image is taken with the position of said movable mirror being arranged in said second position; a depth-of-field preview mode setting unit in which information for setting the mode to a depth-of-field preview mode is inputted; an image display unit including a display region having a first display region and a second display region, the image display unit displaying on said display region the image of the subject obtained by said imaging unit; and a memory configured to store an image;

said image display unit displays a first image on said first display region and a second image on said second display region at a time, the first image being the image of the subject obtained by said imaging unit at a first aperture value of the aperture value set by said aperture setting unit, the second image being the image of the subject obtained by said imaging unit at a second aperture value of the aperture set by said aperture setting unit, and wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and wherein said image display unit includes said display region that further includes a third display region that is associated with said first display region, and a fourth display region that is associated with said second display region, said image display unit displays on said third display region said aperture value set for said first image while the first image is displayed on said first display region, and said image display unit displays on said fourth display region said aperture value set for said second image while the second image is displayed on said second display region.

9. An imaging method in a camera system that comprises an imaging optical system having an aperture, and configured to focus the light from a subject, an imaging unit configured to convert the light from said imaging optical system into an electrical signal to obtain an image of the subject, an image display unit including a display region having a first display region and a second display region, the image display unit displaying on said display region the image of the subject obtained by said imaging unit wherein said image display unit comprises a memory, an aperture setting unit configured to adjust said aperture and set an aperture value of said imaging optical system, and a depth-of-field preview mode setting unit in which information for setting the mode to a depth-of-field preview mode is inputted, the imaging method comprising:
(A) converting the light from said imaging optical system into an electrical signal and obtaining an image;
(B) displaying the image obtained at step (A) on said display region; and
(C) adjusting said aperture and setting the aperture value of said imaging optical system is set;
wherein, in step (B), a first image, being the image of the subject, obtained by step (A) is displayed on said first display region in the case that said aperture value is set to be a first aperture value by step (C), and a second image, being the image of the subject, obtained by step (A) is displayed on said second display region in the case that said aperture value is set in a second aperture value by step (C), and by doing so, both said first image and said second image are displayed on said display region,
wherein, in step (B), the memory of the image display unit stores said first image, and displays said first image stored in said memory on said first display region, and displays said image obtained by said imaging unit on said second display region,
wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and
wherein said image display unit includes said display region that further includes a third display region that is associated with said first display region, and a fourth display region that is associated with said second display region,
said image display unit displays on said third display region said aperture value set for said first image while the first image is displayed on said first display region, and
said image display unit displays on said fourth display region said aperture value set for said second image while the second image is displayed on said second display region.

10. A camera system, comprising:
an imaging optical system having an aperture, and configured to focus the light from a subject;
an imaging unit configured to convert the light from said imaging optical system into an electrical signal to obtain an image of the subject;
an image display unit including a display region having a first display region and a second display region, the image display unit displaying on said display region the image of the subject obtained by said imaging unit;
an aperture setting unit configured to adjust said aperture and set an aperture value of said imaging optical system;
an image recording unit configured to record said aperture value at the time said image is obtained to correspond to said image;
a depth-of-field preview mode setting unit in which information for setting the mode to a depth-of-field preview mode is inputted, and
wherein, (1) in the case that said aperture value is set to a first aperture value by said aperture setting unit, said image display unit displays a first image, being an image of the subject, obtained by said imaging unit at the first aperture value, (2) in the case that said aperture value is set to a second aperture value by said aperture setting unit, said image display unit displays a second image, being an image of the subject, obtained by said imaging unit at the second aperture value, and (3) by doing so, said image display unit displays both said first image and said second image on said display region simultaneously, and
wherein, when (A) information for setting the mode to a depth-of-field preview mode is inputted into the depth-of-field preview mode setting unit, (B) the depth-of-field preview mode is set, and (C) a start process for image capturing is executed,
(1) the aperture setting unit adjusts in a manner that the aperture value of the imaging optical system is set to the first aperture value,
(2) the image recording unit records the first image obtained by said imaging unit with information indicating that the aperture value when the first image is captured is the first aperture value,
(3) the aperture setting unit adjusts in a manner that the aperture value of the imaging optical system is set to the second aperture value, and
(4) the image recording unit records the second image obtained by said imaging unit with information indicating that the aperture value when the second image is captured is the second aperture value, and
wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and
wherein said image display unit includes said display region that further includes a third display region that is associated with said first display region, and a fourth display region that is associated with said second display region,
said image display unit displays on said third display region said aperture value set for said first image while the first image is displayed on said first display region, and
said image display unit displays on said fourth display region said aperture value set for said second image while the second image is displayed on said second display region.

11. A camera system, comprising:
an imaging optical system having an aperture, and configured to focus the light from a subject;
an imaging unit configured to convert the light from said imaging optical system into an electrical signal to obtain an image of the subject;
an image display unit including a display region having a first display region and a second display region, the image display unit displaying on said display region the image of the subject obtained by said imaging unit;
an aperture setting unit configured to adjust said aperture and set an aperture value of said imaging optical system;
an image recording unit configured to record said aperture value at the time said image is obtained to correspond to said image;
an observing optical system for observing the light from said imaging optical system;
a movable mirror arranged between said imaging optical system and said imaging unit, said movable mirror being configured to be either in a first position for leading the light from said imaging optical system to said observing optical system, or in a second position for leading the light from said imaging optical system to said imaging unit;

a photographing mode switching unit that switches between a first photographing mode in which an image is taken with the position of said movable mirror being arranged in said first position, and a second photographing mode in which an image is taken with the position of said movable mirror being arranged in said second position; and a depth-of-field preview mode setting unit in which information for setting the mode to a depth-of-field preview mode is inputted, and wherein, (1) in the case that said aperture value is set to a first aperture value by said aperture setting unit, said image display unit displays a first image, being an image of the subject, obtained by said imaging unit at the first aperture value, (2) in the case that said aperture value is set to a second aperture value by said aperture setting unit, said image display unit displays a second image, being an image of the subject, obtained by said imaging unit at the second aperture value, and (3) by doing so, said image display unit displays both said first image and said second image on said display region simultaneously, and wherein, when (A) information for setting the mode to a depth-of-field preview mode is inputted into the depth-of-field preview mode setting unit, (B) the depth-of-field preview mode is set, and (C) a start process for image capturing is executed, (1) the aperture setting unit adjusts in a manner that the aperture value of the imaging optical system is set to the first aperture value, (2) the photographing mode switching unit switches to the second photographing mode, (3) the image recording unit records the first image obtained by said imaging unit with information indicating that the aperture value when the first image is captured is the first aperture value, (4) the aperture setting unit adjusts in a manner that the aperture value of the imaging optical system is set to the second aperture value, and (5) the image recording unit records the second image obtained by said imaging unit with information indicating that the aperture value when the second image is captured is the second aperture value, and wherein while the depth-of-field preview mode is being set by the depth-of-field preview mode setting unit, the image display unit keeps displaying on the first display region the first image stored in the memory, and at the same time, the imaging unit obtains the second image and the image display unit displays, as a live view image, the second image on the said second display region, and wherein said image display unit includes said display region that further includes a third display region that is associated with said first display region, and a fourth display region that is associated with said second display region, said image display unit displays on said third display region said aperture value set for said first image while the first image is displayed on said first display region, and said image display unit displays on said fourth display region said aperture value set for said second image while the second image is displayed on said second display region.

* * * * *